US012604251B2

(12) United States Patent

Mattam et al.

(10) Patent No.: US 12,604,251 B2
(45) Date of Patent: Apr. 14, 2026

(54) METHOD AND ELECTRONIC DEVICE TO TRANSMIT CAPABILITY FOR DUAL SIM DUAL ACTIVE DEVICE IN WIRELESS COMMUNICATION NETWORK

(71) Applicant: Samsung Electronics Co., Ltd., Suwon-si (KR)

(72) Inventors: Jajohn Mathew Mattam, Bangalore (IN); Jagadeesh Gurugubelli, Bangalore (IN); Vinay Kumar Shrivastava, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 228 days.

(21) Appl. No.: 18/328,274

(22) Filed: Jun. 2, 2023

(65) Prior Publication Data

US 2023/0397079 A1 Dec. 7, 2023

Related U.S. Application Data

(63) Continuation of application No. PCT/KR2023/007549, filed on Jun. 1, 2023.

(30) Foreign Application Priority Data

| Jun. 2, 2022 | (IN) | .............................. | 202241031758 |
| May 10, 2023 | (IN) | .............................. | 202241031758 |

(51) Int. Cl.

| *H04W 36/30* | (2009.01) |
| *H04W 36/00* | (2009.01) |

(Continued)

(52) U.S. Cl.
CPC ... *H04W 36/304* (2023.05); *H04W 36/00698* (2023.05); *H04W 52/40* (2013.01); *H04W 88/06* (2013.01)

(58) Field of Classification Search
CPC ......... H04W 36/304; H04W 36/00698; H04W 52/40; H04W 88/06; H04W 52/281;

(Continued)

(56) References Cited

U.S. PATENT DOCUMENTS

| 2015/0289221 A1* | 10/2015 | Nayak | ................. | H04W 60/005 |
| | | | | 455/435.1 |
| 2015/0296364 A1* | 10/2015 | Peruru | .................. | H04W 88/06 |
| | | | | 455/434 |

(Continued)

FOREIGN PATENT DOCUMENTS

| KR | 10-2021-0133009 | 11/2021 |
| KR | 10-2022-0057306 | 5/2022 |

(Continued)

OTHER PUBLICATIONS

Search Report and Written Opinion dated Sep. 6, 2023 issued in International Patent Application No. PCT/KR2023/007549.

(Continued)

*Primary Examiner* — Liem H. Nguyen

(74) *Attorney, Agent, or Firm* — Nixon & Vanderhye, P.C.

(57) ABSTRACT

A method for transmitting user equipment (UE) capability by a dual subscriber identity module (SIM) dual active (DSDA) user equipment (DSDA UE) is disclosed. The method comprises determining a corresponding service category for each of a first stack and a second stack based on at least one stack parameter indicated by the first stack and the second stack. The method comprises determining a mode associated with the DSDA UE based on the corresponding service categories of the first and second stacks. The method comprises receiving corresponding band information associated with the first and second stacks from at least one network entity associated with a network. The method comprises adjusting the UE based on the mode and the (Continued)

corresponding band information associated with the first and second stacks. The method comprises transmitting the adjusted UE capability to the at least one network entity.

20 Claims, 15 Drawing Sheets

(51) Int. Cl.
    *H04W 52/40*        (2009.01)
    *H04W 88/06*        (2009.01)

(58) Field of Classification Search
    CPC ... H04W 52/346; H04W 76/15; H04W 8/183;
              H04W 76/16; H04W 8/24; H04W 8/22
    See application file for complete search history.

(56)             References Cited

U.S. PATENT DOCUMENTS

| | | | |
|---|---|---|---|
| 2016/0219421 A1* | 7/2016 | Shi | H04M 3/42042 |
| 2017/0127217 A1* | 5/2017 | Miao | H04W 76/15 |
| 2017/0280366 A1* | 9/2017 | Sahu | H04W 60/06 |
| 2020/0336887 A1 | 10/2020 | Ou et al. | |
| 2021/0051748 A1* | 2/2021 | Xu | H04W 8/24 |
| 2021/0204111 A1 | 7/2021 | Jung et al. | |
| 2021/0211963 A1 | 7/2021 | Chau et al. | |
| 2021/0282103 A1 | 9/2021 | Zhu et al. | |
| 2021/0345097 A1 | 11/2021 | Wu | |
| 2022/0015165 A1 | 1/2022 | Han et al. | |
| 2022/0141919 A1* | 5/2022 | Lee | H04W 28/20 |
| | | | 455/552.1 |
| 2022/0141920 A1* | 5/2022 | Kavuri | H04W 76/28 |
| | | | 370/329 |
| 2023/0076852 A1 | 3/2023 | Kim et al. | |

FOREIGN PATENT DOCUMENTS

| | | |
|---|---|---|
| WO | 2019/125508 | 6/2019 |
| WO | 2020197695 A1 | 10/2020 |

OTHER PUBLICATIONS

Extended European Search Report dated Mar. 21, 2025 issued in European Patent Application No. 23816392.7.

Indian Office Action issued Feb. 18, 2026 in corresponding Indian Patent Application No. 202241031758.

* cited by examiner

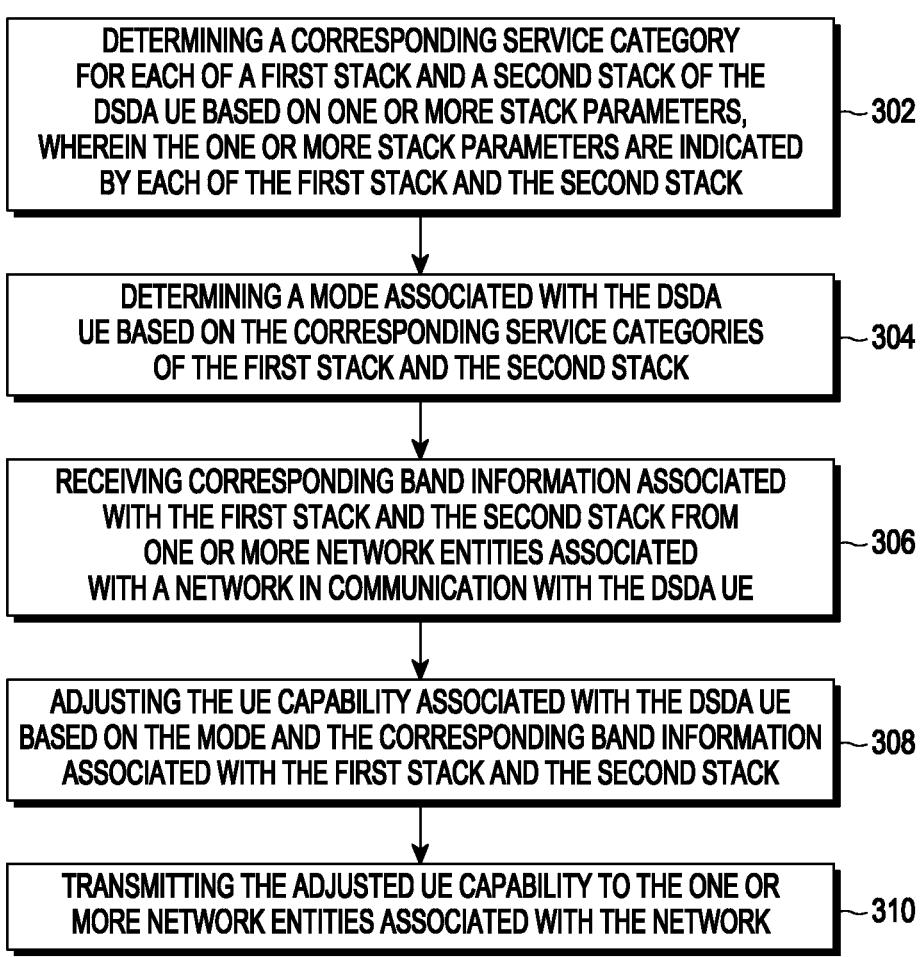

300

DETERMINING A CORRESPONDING SERVICE CATEGORY
FOR EACH OF A FIRST STACK AND A SECOND STACK OF THE
DSDA UE BASED ON ONE OR MORE STACK PARAMETERS,
WHEREIN THE ONE OR MORE STACK PARAMETERS ARE INDICATED
BY EACH OF THE FIRST STACK AND THE SECOND STACK          302

DETERMINING A MODE ASSOCIATED WITH THE DSDA
UE BASED ON THE CORRESPONDING SERVICE CATEGORIES
OF THE FIRST STACK AND THE SECOND STACK          304

RECEIVING CORRESPONDING BAND INFORMATION ASSOCIATED
WITH THE FIRST STACK AND THE SECOND STACK FROM
ONE OR MORE NETWORK ENTITIES ASSOCIATED
WITH A NETWORK IN COMMUNICATION WITH THE DSDA UE          306

ADJUSTING THE UE CAPABILITY ASSOCIATED WITH THE DSDA UE
BASED ON THE MODE AND THE CORRESPONDING BAND INFORMATION
ASSOCIATED WITH THE FIRST STACK AND THE SECOND STACK          308

TRANSMITTING THE ADJUSTED UE CAPABILITY TO THE ONE OR
MORE NETWORK ENTITIES ASSOCIATED WITH THE NETWORK          310

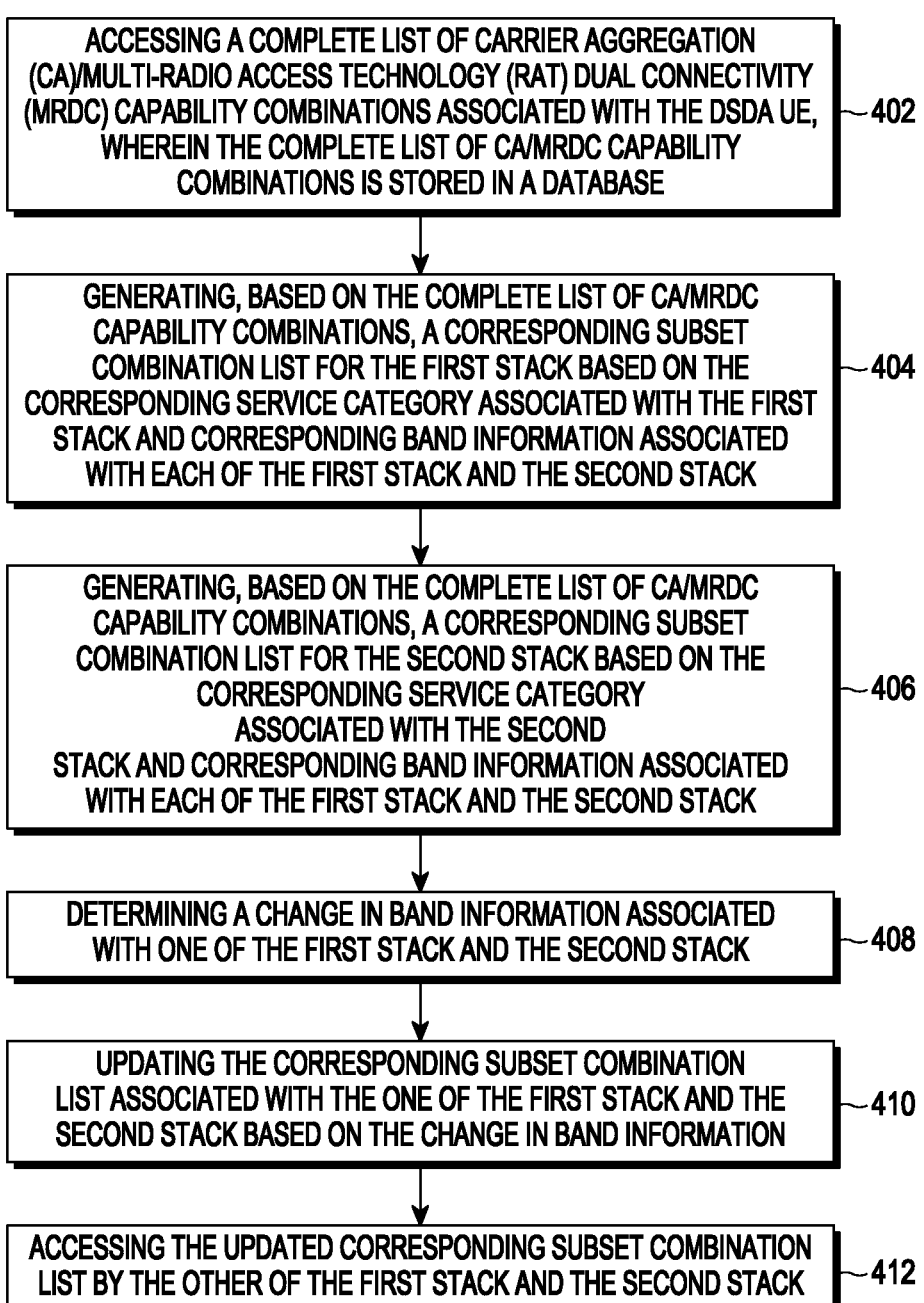

ACCESSING A COMPLETE LIST OF CARRIER AGGREGATION (CA)/MULTI-RADIO ACCESS TECHNOLOGY (RAT) DUAL CONNECTIVITY (MRDC) CAPABILITY COMBINATIONS ASSOCIATED WITH THE DSDA UE, WHEREIN THE COMPLETE LIST OF CA/MRDC COMBINATIONS IS STORED IN A DATABASE ~402

GENERATING, BASED ON THE COMPLETE LIST OF CA/MRDC CAPABILITY COMBINATIONS, A CORRESPONDING SUBSET COMBINATION LIST FOR THE FIRST STACK BASED ON THE CORRESPONDING SERVICE CATEGORY ASSOCIATED WITH THE FIRST STACK AND CORRESPONDING BAND INFORMATION ASSOCIATED WITH EACH OF THE FIRST STACK AND THE SECOND STACK ~404

GENERATING, BASED ON THE COMPLETE LIST OF CA/MRDC CAPABILITY COMBINATIONS, A CORRESPONDING SUBSET COMBINATION LIST FOR THE SECOND STACK BASED ON THE CORRESPONDING SERVICE CATEGORY ASSOCIATED WITH THE SECOND STACK AND CORRESPONDING BAND INFORMATION ASSOCIATED WITH EACH OF THE FIRST STACK AND THE SECOND STACK ~406

DETERMINING A CHANGE IN BAND INFORMATION ASSOCIATED WITH ONE OF THE FIRST STACK AND THE SECOND STACK ~408

UPDATING THE CORRESPONDING SUBSET COMBINATION LIST ASSOCIATED WITH THE ONE OF THE FIRST STACK AND THE SECOND STACK BASED ON THE CHANGE IN BAND INFORMATION ~410

ACCESSING THE UPDATED CORRESPONDING SUBSET COMBINATION LIST BY THE OTHER OF THE FIRST STACK AND THE SECOND STACK ~412

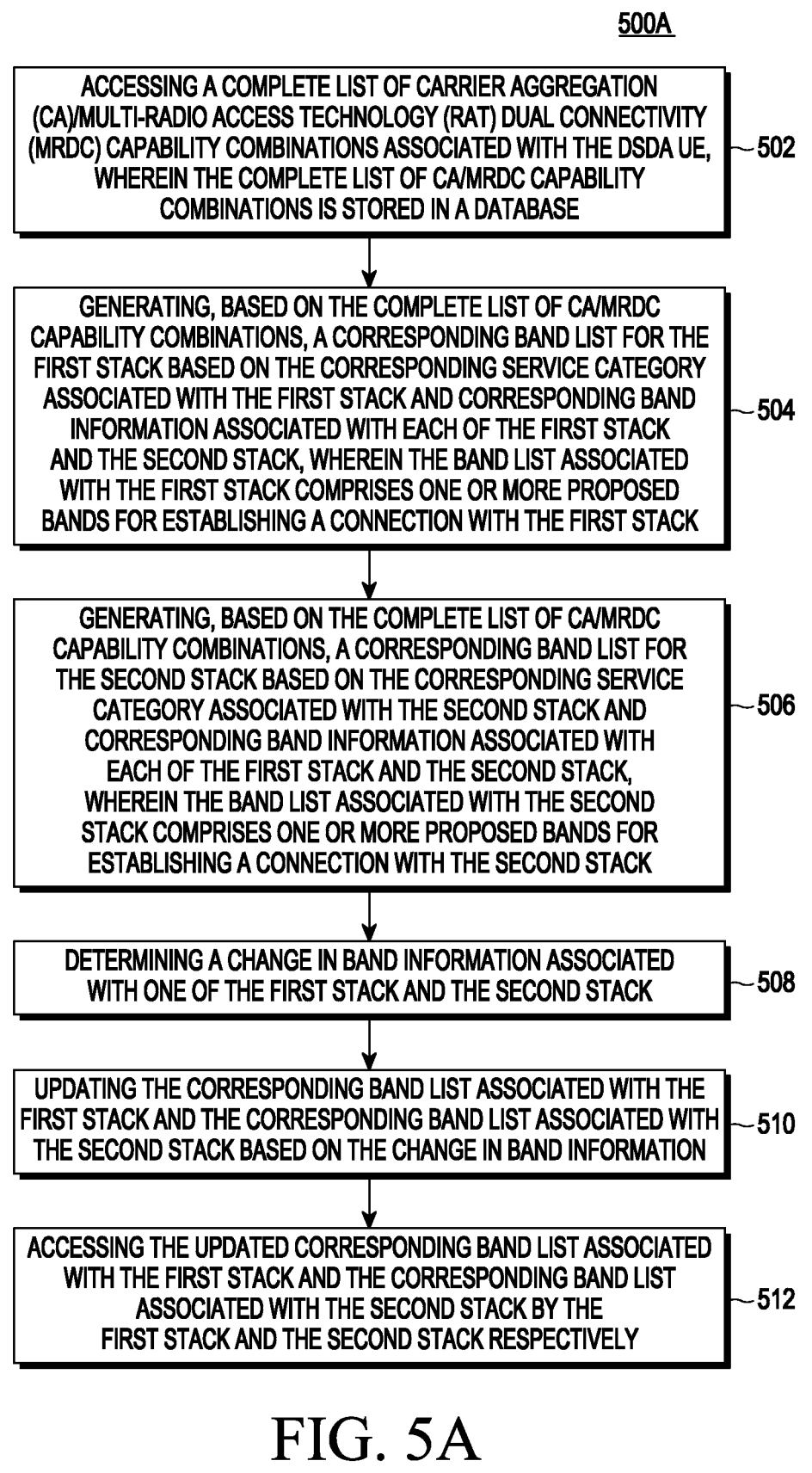

ACCESSING A COMPLETE LIST OF CARRIER AGGREGATION (CA)/MULTI-RADIO ACCESS TECHNOLOGY (RAT) DUAL CONNECTIVITY (MRDC) CAPABILITY COMBINATIONS ASSOCIATED WITH THE DSDA UE, WHEREIN THE COMPLETE LIST OF CA/MRDC CAPABILITY COMBINATIONS IS STORED IN A DATABASE — 502

GENERATING, BASED ON THE COMPLETE LIST OF CA/MRDC CAPABILITY COMBINATIONS, A CORRESPONDING BAND LIST FOR THE FIRST STACK BASED ON THE CORRESPONDING SERVICE CATEGORY ASSOCIATED WITH THE FIRST STACK AND CORRESPONDING BAND INFORMATION ASSOCIATED WITH EACH OF THE FIRST STACK AND THE SECOND STACK, WHEREIN THE BAND LIST ASSOCIATED WITH THE FIRST STACK COMPRISES ONE OR MORE PROPOSED BANDS FOR ESTABLISHING A CONNECTION WITH THE FIRST STACK — 504

GENERATING, BASED ON THE COMPLETE LIST OF CA/MRDC CAPABILITY COMBINATIONS, A CORRESPONDING BAND LIST FOR THE SECOND STACK BASED ON THE CORRESPONDING SERVICE CATEGORY ASSOCIATED WITH THE SECOND STACK AND CORRESPONDING BAND INFORMATION ASSOCIATED WITH EACH OF THE FIRST STACK AND THE SECOND STACK, WHEREIN THE BAND LIST ASSOCIATED WITH THE SECOND STACK COMPRISES ONE OR MORE PROPOSED BANDS FOR ESTABLISHING A CONNECTION WITH THE SECOND STACK — 506

DETERMINING A CHANGE IN BAND INFORMATION ASSOCIATED WITH ONE OF THE FIRST STACK AND THE SECOND STACK — 508

UPDATING THE CORRESPONDING BAND LIST ASSOCIATED WITH THE FIRST STACK AND THE CORRESPONDING BAND LIST ASSOCIATED WITH THE SECOND STACK BASED ON THE CHANGE IN BAND INFORMATION — 510

ACCESSING THE UPDATED CORRESPONDING BAND LIST ASSOCIATED WITH THE FIRST STACK AND THE CORRESPONDING BAND LIST ASSOCIATED WITH THE SECOND STACK BY THE FIRST STACK AND THE SECOND STACK RESPECTIVELY — 512

FIG. 5A

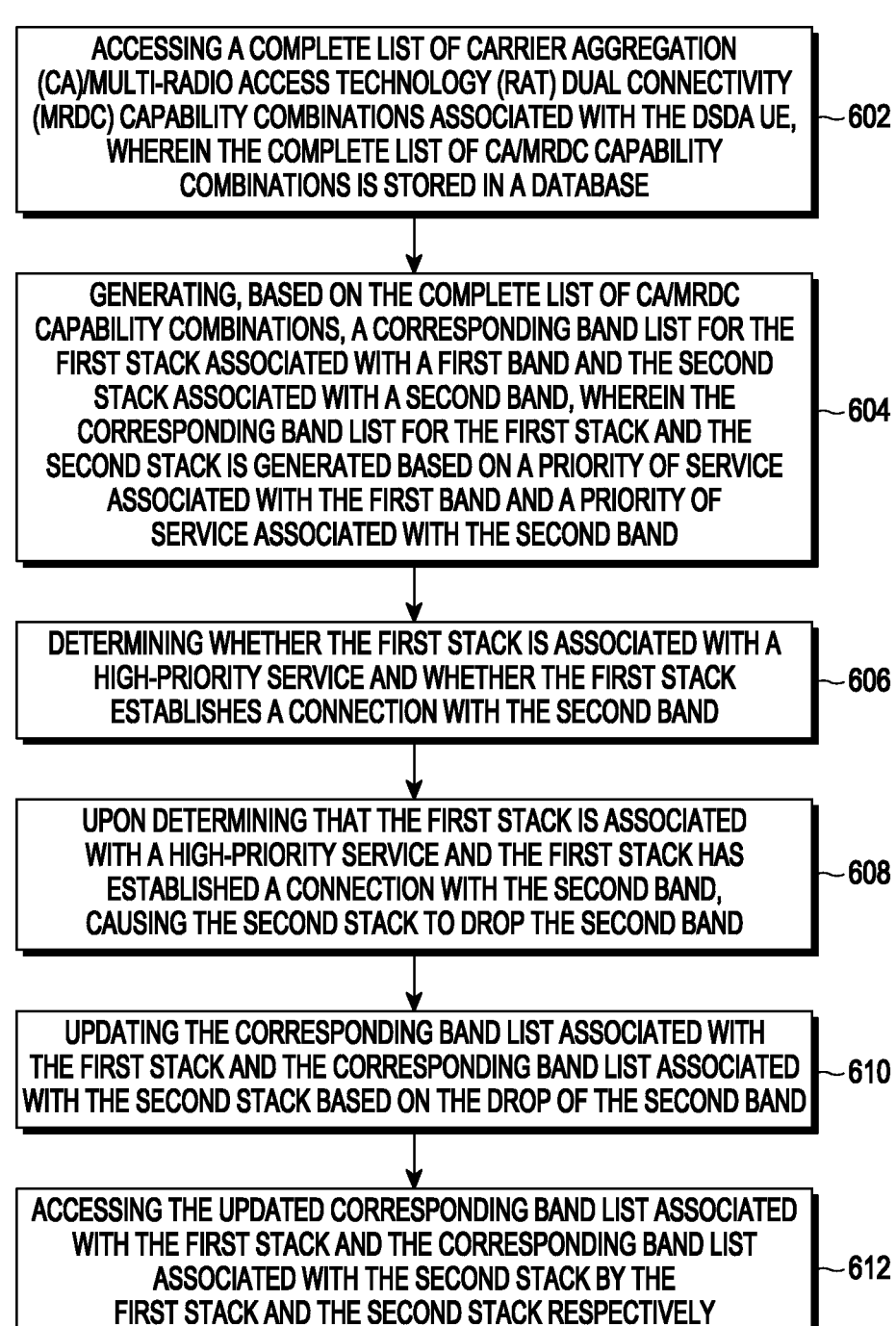

600A

ACCESSING A COMPLETE LIST OF CARRIER AGGREGATION (CA)/MULTI-RADIO ACCESS TECHNOLOGY (RAT) DUAL CONNECTIVITY (MRDC) CAPABILITY COMBINATIONS ASSOCIATED WITH THE DSDA UE, WHEREIN THE COMPLETE LIST OF CA/MRDC CAPABILITY COMBINATIONS IS STORED IN A DATABASE ─ 602

GENERATING, BASED ON THE COMPLETE LIST OF CA/MRDC CAPABILITY COMBINATIONS, A CORRESPONDING BAND LIST FOR THE FIRST STACK ASSOCIATED WITH A FIRST BAND AND THE SECOND STACK ASSOCIATED WITH A SECOND BAND, WHEREIN THE CORRESPONDING BAND LIST FOR THE FIRST STACK AND THE SECOND STACK IS GENERATED BASED ON A PRIORITY OF SERVICE ASSOCIATED WITH THE FIRST BAND AND A PRIORITY OF SERVICE ASSOCIATED WITH THE SECOND BAND ─ 604

DETERMINING WHETHER THE FIRST STACK IS ASSOCIATED WITH A HIGH-PRIORITY SERVICE AND WHETHER THE FIRST STACK ESTABLISHES A CONNECTION WITH THE SECOND BAND ─ 606

UPON DETERMINING THAT THE FIRST STACK IS ASSOCIATED WITH A HIGH-PRIORITY SERVICE AND THE FIRST STACK HAS ESTABLISHED A CONNECTION WITH THE SECOND BAND, CAUSING THE SECOND STACK TO DROP THE SECOND BAND ─ 608

UPDATING THE CORRESPONDING BAND LIST ASSOCIATED WITH THE FIRST STACK AND THE CORRESPONDING BAND LIST ASSOCIATED WITH THE SECOND STACK BASED ON THE DROP OF THE SECOND BAND ─ 610

ACCESSING THE UPDATED CORRESPONDING BAND LIST ASSOCIATED WITH THE FIRST STACK AND THE CORRESPONDING BAND LIST ASSOCIATED WITH THE SECOND STACK BY THE FIRST STACK AND THE SECOND STACK RESPECTIVELY ─ 612

METHOD AND ELECTRONIC DEVICE TO TRANSMIT CAPABILITY FOR DUAL SIM DUAL ACTIVE DEVICE IN WIRELESS COMMUNICATION NETWORK

CROSS-REFERENCE TO RELATED APPLICATIONS

This application is a continuation of International Application No. PCT/KR2023/007549 designating the United States, filed on Jun. 1, 2023, in the Korean Intellectual Property Receiving Office and claiming priority to Indian Provisional Patent Application No. 202241031758, filed on Jun. 2, 2022, and to Indian Complete Patent Application No. 202241031758, filed on May 10, 2023, in the Indian Patent Office, the disclosures of all of which are incorporated by reference herein in their entireties.

BACKGROUND

Field

The disclosure relates to wireless communication systems, and for example, relates to systems and methods to transmit user equipment (UE) capability to a network by a dual subscriber identity module (SIM) dual active (DSDA) user equipment (DSDA UE).

Description of Related Art

Multi-Universal subscriber identity module (MUSIM) devices have been becoming more and more popular in different countries. The support for multi-USIM within a device is currently handled in an implementation-specific manner, resulting in a variety of implementations and UE behaviors. Standardizing support for such UEs can prove beneficial from a performance perspective and the UE behavior can be predictable. Hence, a new work item (WI) is added in R18 RAN2 discussions, e.g., Dual Tx/Rx MUSIM (DSDA MUSIM) to standardize support for such UEs.

DSDA UEs' hardware capabilities are shared by the subscriber identity modules (SIMs), and to use the hardware efficiently and economically, the related capabilities need to be dynamically split between the two SIMs. This can lead to a temporary hardware conflict for the UE. In some cases, the UE may have to release some resources (e.g., SCell/SCG) from one of the two SIMs.

For example, in a UE having SIM A and SIM B, when the UE's SIM A is in radio resource control (RRC) connected state in network (NW) A while the UE's SIM B is in RRC idle or RRC inactive state in NW B, the two transmission chains will be occupied by the SIM A for the communication in NW A. Once the UE's SIM B enters into RRC connected state, one of the transmission chains needs to be switched to SIM B. In this case, if the NW A is not aware of the reduced UE's capability change in the transmission chain, there may be data loss due to demodulation failure and wasting radio resources in NW A.

An objective of the WI is to specify a mechanism to indicate preference on temporary UE capability restriction (e.g., capability update, the release of cells, (de)activation of configured resources) with NW A when UE prefers to start/stop connecting to NW B for MUSIM purpose. One current design of DSDA devices in the market (without R18 MuSIM) includes separate RF chips for both stacks, which provides good performance for both stacks. However, the hardware is expensive. If the RF capability is shared between stacks, the cost is lowered when compared to the above case, and performance will be 50% of what is achieved in separate RF chip cases.

Thus, with the introduction of WI for MuSIM in the DSDA case (NW controlled DSDA behavior), separate RF chips may be used for both stacks which provide the best performance for both stacks. However, the usage of such separate RF chips may imply additional hardware costs and there would be no effect with or without the support of said feature. If the RF capability is shared between stacks, the cost would be lowered when compared to the above case and performance can be improved as the sharing happens only when the sharing is needed. Considering the hardware cost, especially with the introduction of R18 MuSIM, most of the DSDA devices will be using the RF capability on a sharing basis.

Reference is made to FIG. 1 which illustrates a capability exchange and/or RF split flow 100 for DSDA devices, as per an existing technique. The UE may comprise stack 1 and stack 2 in communication with network 1 and network 2. An example scenario is illustrated identifying the issues with the current DSDA devices. Stack 1 is in connected mode and is using the full capability of the device. Stack 2 is in RRC idle or inactive state and is moving to connected mode. At this point, the UE will have to share the RF capability between stacks/SIM and should update the network about the change in capability for stack 1 and the limited capability available for stack 2. However, there is no defined mechanism for the device to share the capability between stacks. Similarly, when the stack 1 is in idle mode, the UE should update the network about the change in capability and when the stack 2 is in idle mode, the UE should update the network about the change in capability.

A convenient and easy choice may be to share 50% of capability to both stacks. However, this is not an effective method, as in many cases, will restrict users from having better QoS. Also, it is not easy to share the capability between stacks and give exactly the same capabilities for both stacks. Hence there has to be a solution to split the capabilities between stacks. The solution must make sure the splitting of capability gives the best QoS to the users.

Based on the above confirmed WI and the objective, there exists a need to introduce the capability exchange between the device and the network due to multiple state changes in SIMs/network. Accordingly, there is a need for the UE to indicate the difference or the updated UE capabilities to the NW whenever applicable and when there is a state change. Further, there is a need to provide a better QoS to the users after splitting RF capability. Accordingly, there is a need to overcome the drawbacks discussed above. For instance, there is a need for methods and systems that allow the UE to seamlessly reselect neighbouring cells without facing interruptions or loss in service.

SUMMARY

According to an example embodiment, a method for transmitting user equipment (UE) capability by a dual subscriber identity module (SIM) dual active (DSDA) user equipment (DSDA UE) is disclosed. The method may comprise determining a corresponding service category for each of the first stack and the second stack based on one or more stack parameters indicated by the first stack and the second stack. The method may comprise determining a mode associated with the DSDA UE based on the corresponding service categories of the first and second stacks. The method may comprise receiving corresponding band information associated with the first and second stacks from at least one network entity associated with a network. The method may comprise adjusting the UE based on the mode and the corresponding band information associated with the first and second stacks. The method may comprise transmitting the adjusted UE capability to the at least one network entity.

According to an example embodiment, an electronic device configured to transmit user equipment (UE) capability by a dual subscriber identity module (SIM) dual active (DSDA) user equipment (DSDA UE) is disclosed. The electronic device comprises a first stack, a second stack, and at least one processor. The at least one processor is configured to determine a corresponding service category for each of the first stack and the second stack based on at least one stack parameter. The at least one stack parameter is indicated by each of the first stack and the second stack. The at least one processor is configured to determine a mode associated with the DSDA UE based on the corresponding service categories of the first stack and the second stack. The at least one processor is configured to receive corresponding band information associated with the first stack and the second stack from at least one network entity associated with a network in communication with the DSDA UE. The at least one processor is configured to adjust the UE capability associated with the DSDA UE based on the mode and the corresponding band information associated with the first stack and the second stack. The at least one processor is configured to transmit the adjusted UE capability to the at least one network entity associated with the network.

The electronic devices described above may be associated with a user equipment (UE).

To further clarify the advantages and features of the present disclosure, a more particular description of disclosure will be rendered by reference to various example embodiments thereof, which are illustrated in the appended drawings. It is appreciated that these drawings depict only example embodiments and are therefore not to be considered limiting of its scope. The disclosure will be described and explained with additional specificity and detail with the accompanying drawings.

BRIEF DESCRIPTION OF THE DRAWINGS

The above and other aspects, features and advantages of certain embodiments of the present disclosure will be more apparent from the following detailed description, taken in conjunction with the accompanying drawings in which like characters represent like parts throughout the drawings, an in which:

FIG. 3 is a flowchart illustrating an example method for transmitting UE capability by the DSDA UE, according to various embodiments;

FIG. 4A is a diagram illustrating an example method for adjusting the UE capability, according to various embodiments;

FIG. 5A is a flowchart illustrating an example method of adjusting the UE capability, according to various embodiments;

FIG. 6A is a flowchart illustrating an example method of adjusting the UE capability, according to various embodiments;

Figure 1:
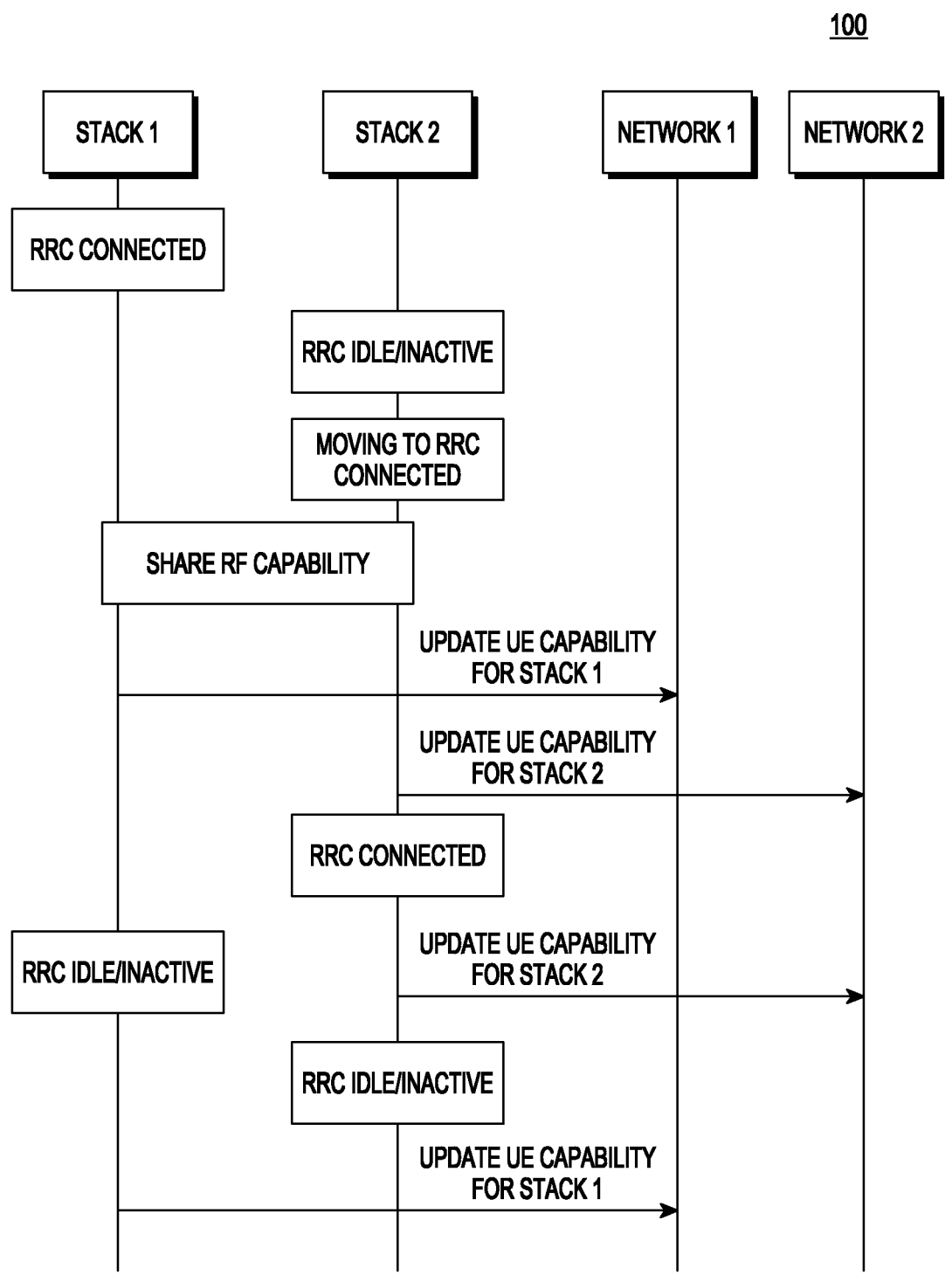
FIG. 1 is a diagram illustrating a capability exchange and/or RF split flow for DSDA devices, as per an existing technique.

Further, skilled artisans will appreciate that elements in the drawings are illustrated for simplicity and may not have necessarily been drawn to scale. For example, the flowcharts illustrate the methods. Furthermore, in terms of the construction of the device, one or more components of the device may have been represented in the drawings by conventional symbols, and the drawings may show only those specific details that are pertinent to understanding the various example embodiments so as not to obscure the drawings with details that will be readily apparent to those of ordinary skill in the art having the benefit of the description herein.

DETAILED DESCRIPTION

Reference will now be made to various example embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this disclosure to "an aspect", "another aspect" or similar language may refer, for example, to a particular feature, structure, or characteristic described in connection with the embodiment being included in at least one embodiment of the disclosure. Thus, appearances of the phrase "in an embodiment", "in another embodiment" and similar language throughout this disclosure may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The present disclosure provides methods and systems for transmitting user equipment (UE) capability by a DSDA UE to the network. For instance, the UE may comprise two SIM stacks and may split the capability between the two stacks. The UE may inform the network of the UE capability. The capability may be split based on services being used by the stacks, the serving cells for the UE, and/or the neighbouring cells for the UE. Accordingly, a mechanism may be provided to indicate to the network UE capability-related information, such as, but not limited to, preference for temporary UE capability restriction, capability updates, the release of cells, and (de)activation of configured resources. As an example, a change in capability for one of the two stacks and/or limited capability for one of the two stacks may be informed to the network. The network may thus be aware of the UE capabilities and a loss in quality of service may be prevented and/or reduced at the UE.

Figure 2:
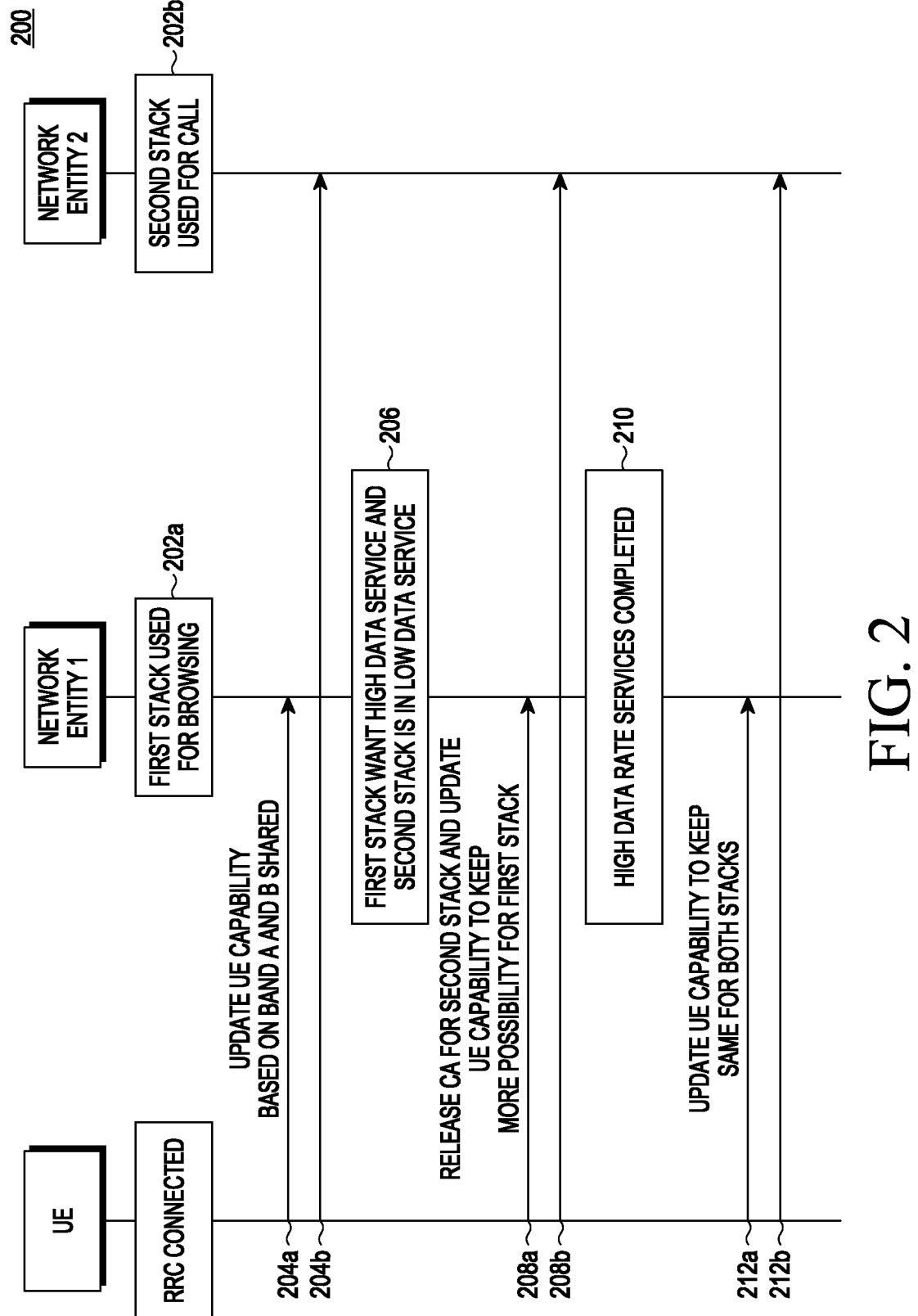
FIG. 2 is a signal flow diagram illustrating an overview of the transmission of capability by the UE to the network, according to various embodiments.

FIG. 2 is a signal flow diagram 200 illustrating an example of the transmission of capability by the UE to the network according to various embodiments. The UE and its associated functions along with architecture are explained in greater detail below in conjunction with at least FIG. 10. In various embodiments, the UE may transmit a modified capability to the network. As seen in FIG. 2, the UE is in communication with a first network entity and a second network entity. The network entity and its associated functions along with architecture are explained in conjunction with at least FIG. 9. The UE may comprise a first stack and a second stack, in that, the first stack may be in communication with the first network entity and the second stack may be in communication with the second network entity.

In the illustrated embodiment, the first network entity may provide browsing-related data to the first stack, as shown by blocks 202a, and the second network entity may provide calling-related data to the second stack, as shown by block 202b. The first stack may be in a connected mode with the first network entity while the second stack may be moving to the connected mode with the second network entity. The UE may thus update the UE capability based on frequency bands associated with the first network entity and the second network entity, such as, bands A and bands B that are shared, as shown by arrows 204a and 204b. The updated UE capabilities may then be transmitted to the network entities.

In various embodiments, both the first stack and the second stack may be in connected mode. The second stack may be utilizing a low-data service such as an audio call. The first stack may trigger a high data service such as video streaming, as shown by block 206. In such a case, as shown by arrows 208a and 208b, the UE may release carrier aggregation (CA) for the second stack since a low data service is being used, and further, the UE capabilities may be updated so as to keep more possibilities for the first stack. The updated UE capabilities may then be transmitted to the network entities.

Further, once the high data service is completed by the first stack, as shown by block 210, the first stack may not require carrier aggregation. The UE may update the UE capabilities so as to share the UE capabilities equally with both the first stack and the second stack, as shown by arrow 212a and 212b, and the updated UE capabilities may then be transmitted to the network entities.

In various embodiments, the UE capabilities may be updated upon identifying a change of cell or a change in frequency band information. In various embodiments, a service that is triggered or is ongoing in both stacks to split the capability is considered. In various embodiments, the serving cell and neighbouring cells of each stack to split the capability may be considered. In various embodiments of service-based splitting, the capability may be split based on the type of services required by stacks. Upon receiving the request to move to a connected mode, the mode of splitting may be determined. In various embodiments of cell-based splitting, the capability may be split based on the serving and optionally neighbour cells (such as, from system information block SIB) of each stack. Upon receiving the request to move to connected mode, the serving and neighbouring cell of the stack may be checked and the band information may be indicated. In various embodiments, the updated capability may be sent to the RRC of both stacks and further, the RRC may send the updated capability to respective network entities.

FIG. 3 is a flowchart illustrating an example method 300 for transmitting UE capability by the DSDA UE, according to various embodiments. The method 300 may be performed by the UE. In various embodiments, the UE may comprise a first stack and a second stack. In various embodiments, the first stack may be associated with a first subscriber identity module (SIM) of the UE and the second stack may be associated with a second SIM of the UE. The UE and its associated functions along with architecture are explained in greater detail below with reference to at least FIG. 10. The UE may include, but is not limited to, a mobile phone, a tablet, a smart watch, and any other electronic device which is capable of connecting to a 4G and/or 5G network.

The UE may be in communication with one or more network entities. The network entities and associated functions along with the corresponding architecture are explained in greater detail below with reference to at least FIG. 9. In various embodiments, the network entity may be a network node in a 5G network, such as a 5G core network (5GC) or a network node in LTE network.

In various embodiments, the network entities may be associated with one or more network operators, such as a first operator and a second operator. In various embodiments, the first operator may be associated with the first stack and the second operator may be associated with the second stack.

At step 302, a corresponding service category is determined for each of the first stack and the second stack based on one or more stack parameters. The corresponding service category may refer to a type of service that is triggered or ongoing in the stacks. For instance, a first type of service may be used by the first stack and a different, second type of service may be used by the second stack. The UE capability may be split based on the type of service being used by the first stack and the second stack.

In various embodiments, the type of service may include high data services and low data services. For instance, the type of services may include audio calling, video calling, video streaming, and the like. In various embodiments, the service categories may be classified based on the one or more stack parameters. In various non-limiting examples, the service categories may be classified as small data (SD), high data (HD), and Call based on the one or more stack parameters.

In various embodiments, the one or more stack parameters may be indicated by each of the first stack and the second stack. In various embodiments, the one or more stack parameters comprise one or more of buffer occupancy, amount of data arrival, latency details, and data type.

In various embodiments, both the first stack and the second stack may indicate respective one or more stack parameters and the UE may split the capability based on the one or more stack parameters.

In various embodiments, the buffer occupancy may be one of low, medium, or high. In various embodiments, the data arrival may be one of low, medium, or high. In various embodiments, the latency requirements may be one of low, fixed or no requirements. In various embodiments, the data type may be one of a combination of frequent data, urgent data, small data, medium data, high data, calls, messages (SMS), etc.

Further, based on the different combinations of the one or more stack parameters, the corresponding service category may be determined. Table 1 illustrates the category of service for a particular stack based on the one or more stack parameters, according to a non-limiting example:

TABLE 1

| Buffer Occupancy | Data Arrival | Latency | Data Type | Category |
|---|---|---|---|---|
| Low | Medium/ High | Low | Frequent + urgent small data | SD1 |
| Low | Medium/ High | No latency requirement | Frequent + small data | SD1 |
| Low | Low | Low | Infrequent + urgent small data | SD2 |
| Low | Low | No latency requirement | Infrequent + small data | SD2 |
| Medium/ High | Medium/ High | Low | Frequent + urgent medium/high data | HD1 |
| Medium/ High | Medium/ High | No latency requirement | Frequent + medium/high data | HD1 |
| Medium/ High | Low | Low | Infrequent + urgent medium/high data | HD2 |
| Medium/ High | Low | No latency requirement | Infrequent + medium/high data | HD2 |
| Fixed | Fixed | Fixed | Call/SMS | Call |

Table 1

As shown in Table 1, the service category for a particular stack may be determined based on the one or more stack parameters associated with the particular stack. Accordingly, the service category for the first stack and service category for the second stack may be determined based on the respective one or more stack parameters, such as, SD1, SD2, HD1, HD2, Call, etc.

At step 304, a mode associated with the UE may be determined based on the corresponding service categories of the first stack and the second stack. In various embodiments, in the UE, the first stack and the second stack may have their corresponding service categories, in that, a combination of the service category of the first stack and the service category of the second stack may be provided. In various embodiments, a current combination of the corresponding service category of the first stack with the corresponding service category of the second stack may be determined. The current combination may define the corresponding service categories of the first and second stack based on the service being used by the first and second stack.

Further, in various embodiments, a list of pre-stored service category combinations may be stored in a database, for instance, a database accessible by the UE. In various embodiments, the list of pre-stored service category combinations may comprise a plurality of service combinations of the corresponding service categories of the first stack and the second stack. In various embodiments, each of the plurality of service combinations may be associated with a linked mode, in that, a particular service category combination may be associated with a linked mode such that when the particular service category combination is identified, the UE may be aware of the linked mode for the particular service category combination.

Further, in various embodiments, a matched service category combination may be identified from the list of pre-stored service category combinations. The matched service category combination may match the determined combination of the corresponding service category of the first stack with the corresponding service category of the second stack.

Tables 2A and 2B illustrate linked modes associated with various pre-stored service category combinations as shown below:

TABLE 2A

| Category | | |
|---|---|---|
| First Stack | Second stack | Mode |
| HD1 | HD2 | 1 |
| | SD1 or SD2 | 2 |
| | Call | 3 |
| HD2 | SD1 | 1 |
| | SD2 | 2 |
| | Call | 3 |
| SD1 | SD2 | 1 |
| | Low Call | 2 |
| SD2 | Call | 1 |
| Call | Call | 1 |

TABLE 2B

| Category | | |
|---|---|---|
| First Stack | Second stack | Mode |
| HD1 | HD2 | 4 |
| | SD1 or SD2 | 5 |
| | Call | 6 |
| HD2 | SD1 | 4 |
| | SD2 | 5 |
| | Call | 6 |
| SD1 | SD2 | 4 |
| | Low Call | 5 |
| SD2 | Call | 4 |
| Call | Call | 5 |

As seen in Tables 2A and 2B, in case the service category of stack 1 is HD1 and the service category of stack 2 is HD2, then the linked mode maybe 1. Similarly, in case the service category of stack 1 is HD2 and the service category of stack 2 is Call, then the linked mode may be 3. Accordingly, the list of pre-stored service category combinations may be provided associated with various linked modes.

Further, in various embodiments, the linked mode associated with the matched service category combination may be accessed and the linked mode may be determined to be the mode associated with the UE. For instance, based on services being used by the UE, the first stack may be associated with service category SD1 while stack 2 may be associated with service category Call. In such a scenario, based on the pre-stored service category combinations, the mode for the UE may be determined as mode 2.

In various embodiments, the modes may define specific capabilities of the first stack and the second stack. For instance, in mode 1, the first stack may have full capability while the second stack may have capability specific to the serving and neighbouring bands. In mode 2, both the first and second stacks may have capabilities specific to the serving and neighbouring bands. In mode 3, the first stack may have full capability while the second stack may only have band support with no carrier aggregation.

At step 306, corresponding band information associated with the first stack and the second stack may be received from the one or more network entities associated with the network. The network may be a network in communication with the UE. Further, as described above, the one or more network entities may comprise a first entity in communication with the first stack and a second entity in communication with the second stack.

In various embodiments, for each of the first stack and the second stack, a corresponding system information block (SIB) from the one or more network entities may be received by the UE, such as, in a communication signal. Further, band information may be extracted from the corresponding SIB so as to obtain cell information. In particular, the band information may comprise serving cell information and neighbouring cell information for each of the first stack and the second stack.

At step 308, the UE capability associated with the UE may be adjusted based on the mode and the corresponding band information associated with the first stack and the second stack. In various embodiments, a complete list of Carrier Aggregation (CA)/Multi-Radio Access Technology (RAT) Dual Connectivity (MRDC) capability combinations may be stored in a database, such as an internal or external database accessible by the UE. The complete list of CA/MRDC capability combinations may be accessed by the UE and a corresponding subset combination list of each of the first and second stacks may be generated. Based on the change in band information associated with the first stack and the second stack, such as in SIB from the one or more network entities, the corresponding subset combination list for the first stack and the second stack may be updated.

At step 310, the adjusted UE capability may be transmitted to the one or more network entities associated with the network. In various embodiments, the adjusted UE capability may be transmitted via the radio resource control (RRC) of the first and/or second stacks, to the one or more network entities of the network. In various embodiments, adjusting the UE capability may comprise splitting the UE capability based on the band information. In various embodiments, the capability may be split based on bands into full capability, capability specific to the serving and neighbour bands, and only band support with no carrier aggregation (CA).

In various embodiments, the subset combination list may be hashed based on the band information, and the subset combination list is shared with the network entities associated with both the first stack and the second stack. In various embodiments, the subset combination list may be updated for every carrier aggregation (CA) addition or removal for one of the first and second stacks.

Reference is made to FIG. 4A. FIG. 4A is a flowchart illustrating an example method 400A of adjusting the UE capability according to various embodiments. The method 400A may be performed by the UE.

At step 402, a complete list of Carrier Aggregation (CA)/Multi-Radio Access Technology (RAT) Dual Connectivity (MRDC) capability combinations associated with the DSDA UE is accessed by the UE from a database.

As described above, the corresponding service category associated with the first and second stack and corresponding band information associated with the first and second stack is determined.

At step 404, a corresponding subset combination list for the first stack may be generated based on the corresponding service category associated with the first stack and corresponding band information associated with each of the first stack and the second stack.

Further, at step 406, a corresponding subset combination list for the second stack may be generated based on the corresponding service category associated with the second stack and corresponding band information associated with each of the first stack and the second stack.

At step 408, a change in band information associated with one of the first stack and the second stack is determined. In various embodiments, the change in band information may be determined based on SIB received from the one or more network entities. In various embodiments, the change in band information may be present in case of additions or removal of secondary cell bands.

At step 410, the corresponding subset combination list associated with one of the first stacks and the second stack is updated based on the change in band information. For instance, in case there is a change in band information for the first stack, the subset combination list associated with the first stack is updated.

At step 412, the updated corresponding subset combination list is accessed by the other of the first stack and the second stack. For instance, in case there is a change in band information for the first stack, the subset combination list associated with the first stack is updated and the subset combination list associated with the first stack is accessed by the second stack. Similarly, in case there is a change in band information for the second stack, the subset combination list associated with the second stack is updated and the subset combination list associated with the second stack is accessed by the first stack.

In various embodiments, the subset combination list may be updated in case there is a service charge associated with the first stack or the second stack. In such scenarios, a change in service category associated with one of the first stacks and the second stack is determined. Further, the corresponding subset combination list associated with the first stack and the corresponding subset combination list associated with the second stack is updated, upon determining a change in service category associated with one of the first stack and the second stack, based on the band information associated with the first stack and the second stack. Furthermore, the updated corresponding subset combination list associated with the first stack and the updated corresponding subset combination list associated with the second stack is accessed by the first stack and the second stack respectively.

Figure 4B:
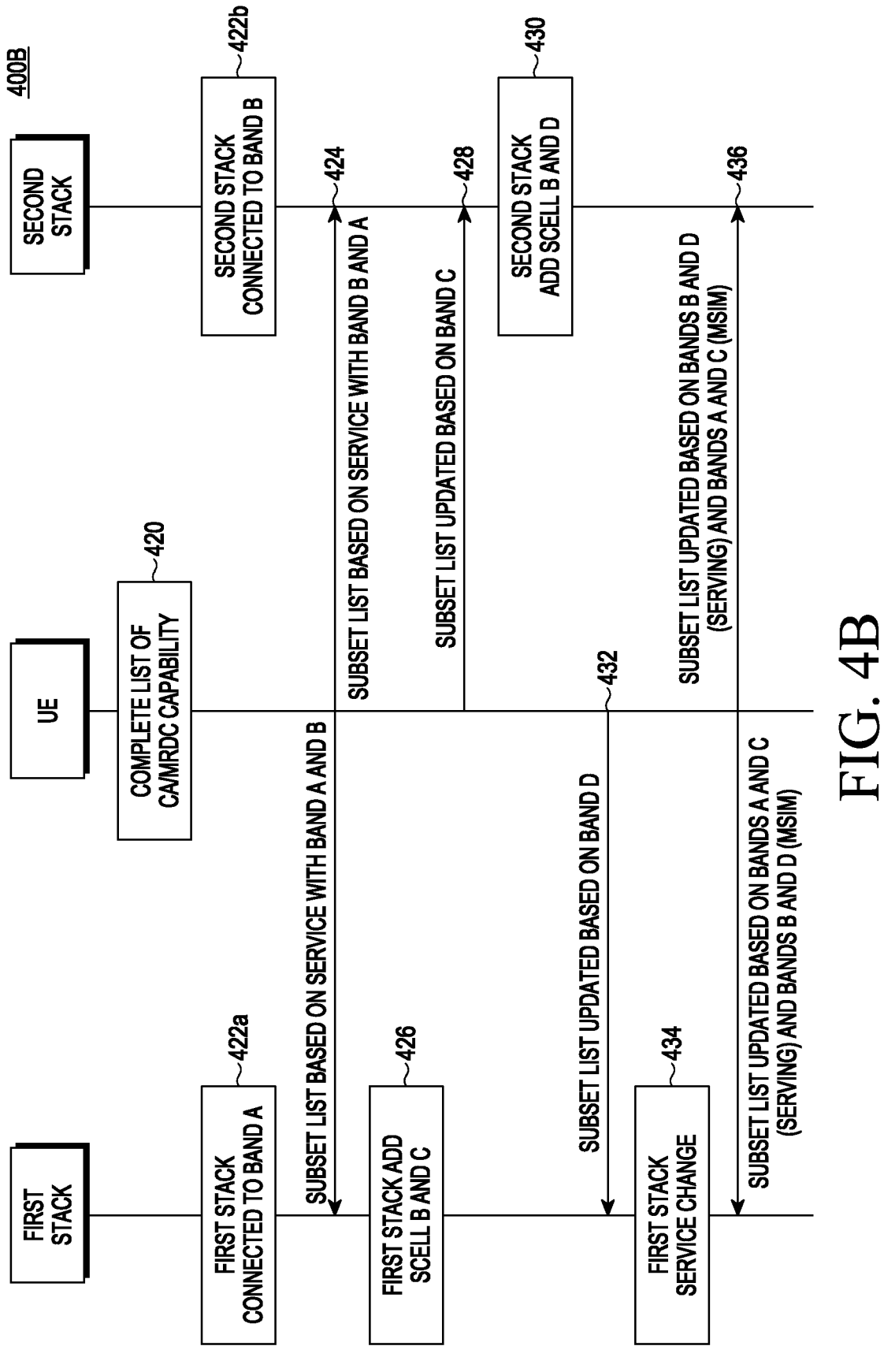
FIG. 4B is a signal flow diagram illustrating an example of adjusting the UE capability, according to various embodiments.

Reference is made to FIG. 4B. FIG. 4B is a signal flow diagram illustrating an example process flow 400B for adjusting the UE capability, according to various embodiments. The UE and its associated functions along with architecture are explained in in greater detail below with reference to at least FIG. 10.

At block 420, a complete list of CA/Multi-RAT Dual Connectivity (MRDC) capability combinations associated with the DSDA UE is accessed by the UE from a database. At blocks 422*a* and 422*b*, the first stack may be connected to the first band, e.g., band A, while the second stack may be connected to the second band, e.g., band B.

At 424, the subset combination list is determined for the first stack and the second stack. For the first stack, the subset combination list may be determined based on the service category with the band A (which is the serving cell) and band B (multi-SIM). For the second stack, the subset combination list may be determined based on the service category with the band B (which is the serving cell) and band A (multi-SIM).

At block 426, the first stack may add a secondary cell Scell C and a change in band information associated with the first stack is determined. At 428, the subset combination list associated with the first stack is updated based on the change in band information, and the updated corresponding subset combination list is accessed by the other of the first stack and the second stack.

At block 430, the second stack may add a secondary cell Scell D and a change in band information associated with the second stack is determined. At 432, the subset combination list associated with the second stack is updated based on the change in band information, and the updated corresponding subset combination list is accessed by the first stack.

At block 434, a change in service category associated with one of the first stacks and the second stack is determined. Based on the band information associated with the first stack and the second stack, the subset combination list is updated at 436. For instance, the subset combination list associated with the first stack is adjusted based on the serving cell for the first stack as well as the multi-SIM of the first stack. Further, the subset combination list associated with the second stack is adjusted based on the serving cell for the second stack as well as the multi-SIM of the second stack and the adjusted subset combination lists are accessed by the UE.

Reference is made to FIG. 5A. FIG. 5A is a flowchart illustrating an example method 500A for adjusting the UE capability according to various embodiments. The method 500A may be performed by the UE. In various embodiments, the addition of single bands may be informed to the network and updated for each carrier aggregation addition or removal for both the first and second stacks. The message size may be reduced in such a scenario.

At step 502, a complete list of Carrier Aggregation (CA)/Multi-Radio Access Technology (RAT) Dual Connectivity (MRDC) capability combinations associated with the DSDA UE is accessed by the UE from a database.

As described above, the corresponding service category associated with the first and second stack and corresponding band information associated with the first and second stack is determined.

At step 504, a corresponding band list for the first stack may be generated based on the corresponding service category associated with the first stack and corresponding band information associated with each of the first stack and the second stack. In various embodiments, the band list associated with the first stack may comprise one or more proposed bands for establishing a connection with the first stack.

At step 506, a corresponding band list for the second stack may be generated based on the corresponding service category associated with the second stack and the corresponding band information associated with each of the first stack and the second stack. In various embodiments, the band list associated with the second stack may comprise one or more proposed bands for establishing a connection with the second stack.

At step 508, a change in band information associated with one of the first stacks and the second stack is determined. In various embodiments, the change in band information may be identified when the first stack and/or the second stack adds a secondary cell. In various embodiments, the change in band information may be identified when the first stack and/or the second stack drops a secondary cell. In various embodiments, the change in band information may be identified when the first stack and/or the second stack is using a high-priority service. At step 510, the corresponding band list associated with the first stack and the corresponding band list associated with the second stack is updated based on the change in band information.

At step 512, the updated corresponding band list associated with the first stack and the corresponding band list associated with the second stack is accessed by the first stack and the second stack respectively. In various embodiments, in a scenario where the first stack has a higher carrier aggregation than required based on the service being used by the first stack, then the carrier aggregation band may be made available for the second stack. Further, in case the second stack requests the addition of carrier aggregation band(s), the carrier aggregation band(s) may be dropped from the first stack and added to the second stack.

Figure 5B:
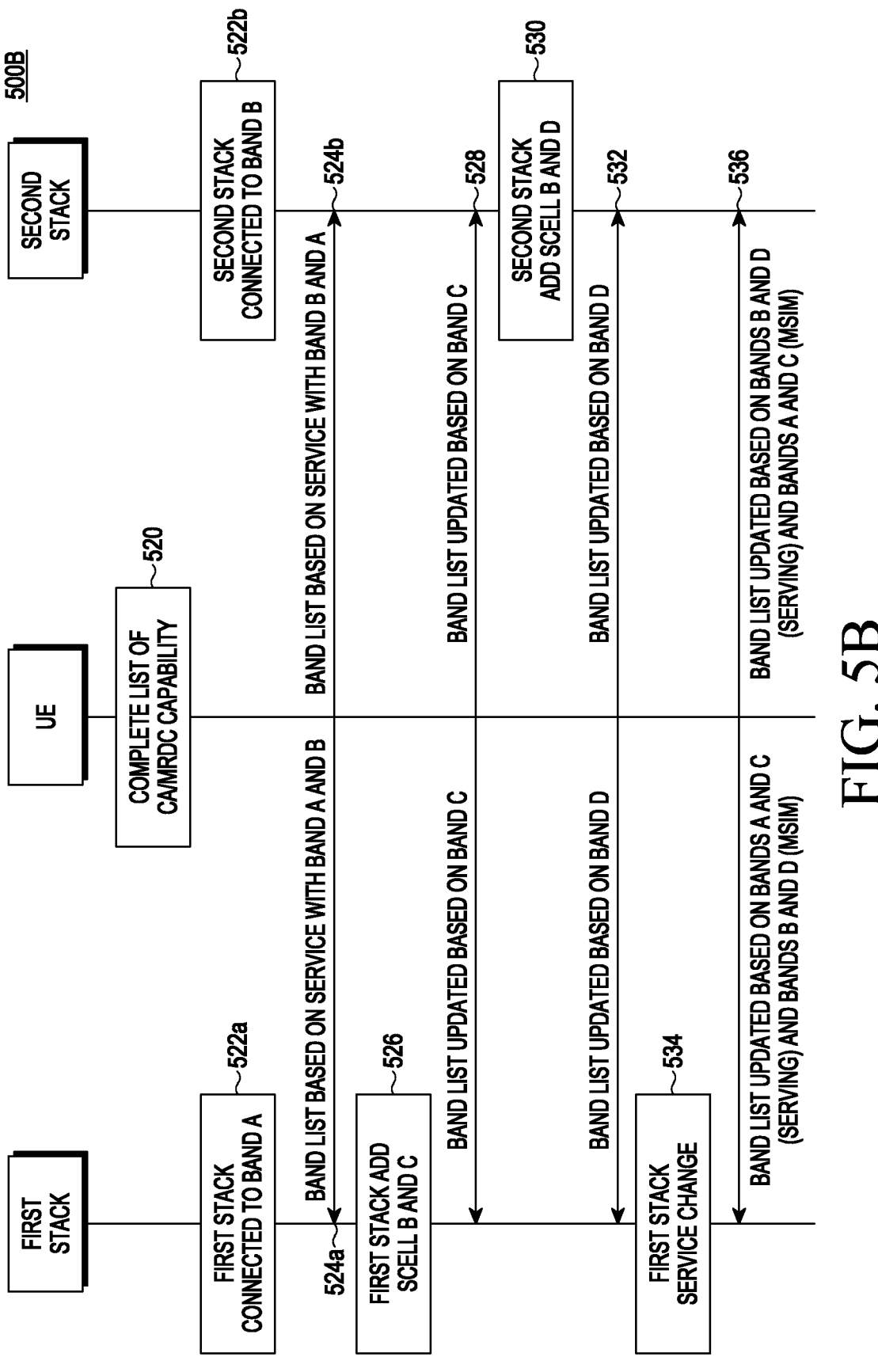
FIG. 5B is a signal flow diagram illustrating an example of adjusting the UE capability, according to various embodiments.

Reference is made to FIG. 5B. FIG. 5B is a signal flow diagram illustrating an example process flow 500B for adjusting the UE capability, according to various embodiments. The UE and its associated functions along with architecture are explained in greater detail below with reference to at least FIG. 10.

At block 520, a complete list of CA/Multi-RAT Dual Connectivity (MRDC) capability combinations associated with the DSDA UE is accessed by the UE from a database.

At blocks 522*a* and 522*b*, the first stack may be connected to a first band, e.g., band A, while the second stack may be connected to a second stack, e.g., band B.

At 524*a* and 524*b*, a corresponding band list for the first stack and the second stack is generated based on the corresponding service category associated with the first stack and the second stack. For instance, for the first stack, the band list may be generated based on service with band A (which is the serving cell) and band B (MSIM). Similarly, for the second stack, the band list may be generated based on service with band B (which is the serving cell) and band A (MSIM). In various embodiments, the band list may have a one-band depth combination.

At block 526, the first stack may add secondary cell Scell bands B and C.

At 528, the band list is updated for both the first stack and the second stack. That is, the corresponding band list of the first stack is updated with band C (which is the serving cell) while the corresponding band list of the second stack is updated with band C (MSIM).

At block 530, the second stack may add a secondary cell Scell band D. At 532, the band list is updated for both the first stack and the second stack. That is, the corresponding band list of the first stack is updated with band D (MSIM) while the corresponding band list of the second stack is updated with band D (serving cell).

At block 534, a change in service category associated with one of the first stacks and the second stack is determined. Based on the band information associated with the first stack and the second stack, the band list is updated at 536. For instance, the band list associated with the first stack is adjusted based on the serving cell for the first stack (bands A and C) as well as the bands B and D associated with the second stack. Similarly, the band list associated with the second stack is adjusted based on the serving cell for the second stack (bands B and D) as well as the bands A and C associated with the first stack. The adjusted band lists may then be accessed by the UE.

Reference is made to FIG. 6A. FIG. 6A is a flowchart illustrating an example method 600A for adjusting the UE capability according to various embodiments. The method 600A may be performed by the UE. In various embodiments, in case one of the first and second stacks has higher carrier aggregation than required based on the service being used, then the carrier aggregation band may be considered as available, and further, in case other of the first and second stacks requests carrier aggregation, the particular carrier aggregation band may be dropped and provided to the other of the first and second stack.

At step 602, a complete list of Carrier Aggregation (CA)/Multi-Radio Access Technology (RAT) Dual Connectivity (MRDC) capability combinations associated with the DSDA UE is accessed by the UE from a database.

As described above, the corresponding service category associated with the first and second stack and corresponding band information associated with the first and second stack is determined.

At step 604, a corresponding band list for the first stack associated with a first band and the second stack associated with a second band may be generated based on the complete list of CA/MRDC combinations. In various embodiments, the corresponding band list for the first stack and the second stack is generated based on a priority of service associated with the first band and a priority of service associated with the second band.

At step 606, a determination is made whether the first stack is associated with a high-priority service and whether the first stack establishes a connection with the second band. Upon determining that the first stack is associated with a high-priority service and the first stack has established a connection with the second band, the method proceeds to steps 608-612.

At step 608, the second stack is caused to drop the second band.

At step 610, the corresponding band list associated with the first stack and the corresponding band list associated with the second stack are updated based on the drop of the second band.

Further, at step 612, the updated corresponding band list associated with the first stack and the corresponding band list associated with the second stack by the first stack and the second stack is accessed by the UE.

Figure 6B:
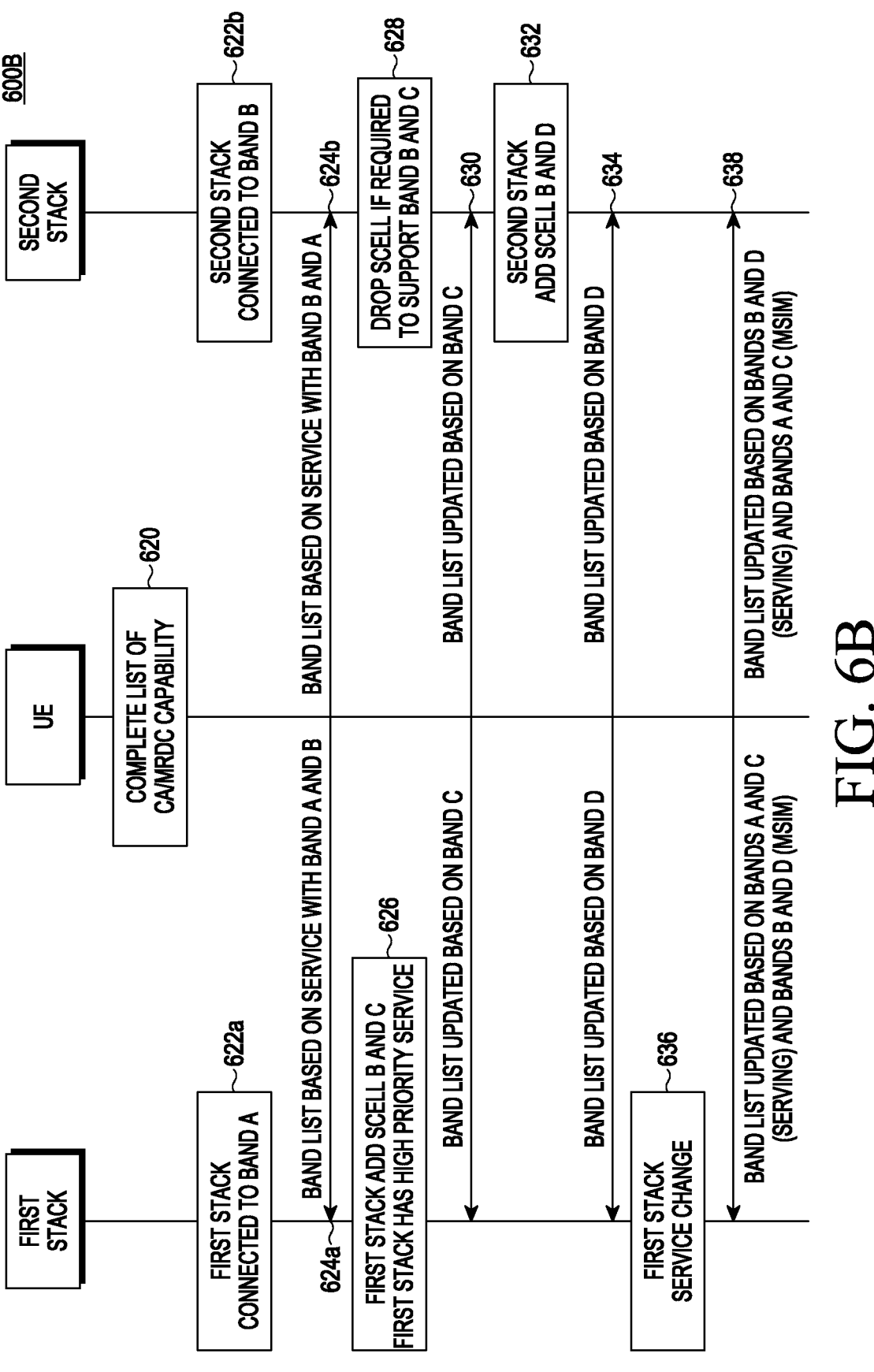
FIG. 6B is a signal flow diagram illustrating an example method of adjusting the UE capability, according to various embodiments.

Reference is made to FIG. 6B. FIG. 6B is a signal flow diagram illustrating an example process flow 600B for adjusting the UE capability, according to various embodiments. The UE and its associated functions along with architecture are explained in greater detail below with reference to at least FIG. 10.

At block 620, a complete list of CA/Multi-RAT Dual Connectivity (MRDC) capability combinations associated with the DSDA UE is accessed by the UE from a database. At blocks 622a and 622b, the first stack may be connected to a first band, say, band A, while the second stack may be connected to a second stack, say band B.

At 624a and 624b, a corresponding band list for the first stack and the second stack is generated based on the corresponding service category associated with the first stack and the second stack. For instance, for the first stack, the band list may be generated based on service priority with band A (which is the serving cell) and band B (MSIM). Similarly, for the second stack, the band list may be generated based on service priority with band B (which is the serving cell) and band A (MSIM). In various embodiments, the band list may have a one-band depth combination.

At block 626, the first stack may add secondary cell Scell bands B and C. Further, the first stack may have a high-priority service.

At block 628, the second stack may drop Scell in case such a drop is required to support band B and band C.

At 630, the band list is updated for both the first stack and the second stack. That is, the corresponding band list of the first stack is updated with band C (which is the serving cell) while the corresponding band list of the second stack is updated with band C (MSIM).

At block 632, the second stack may add a secondary cell Scell D.

At 634, the band list is updated for both the first stack and the second stack. That is, the corresponding band list of the first stack is updated with band D (MSIM) while the corresponding band list of the second stack is updated with band D (serving cell).

At block 636, a change in service category associated with one of the first stacks and the second stack is determined. Based on the band information associated with the first stack and the second stack, the band list is updated at 638. For instance, the band list associated with the first stack is adjusted based on the serving cell for the first stack (bands A and C) as well as the bands B and D associated with the second stack. Similarly, the band list associated with the second stack is adjusted based on the serving cell for the second stack (bands B and D) as well as the bands A and C associated with the first stack. The adjusted band lists may then be accessed by the UE.

In various embodiments, the first stack may be associated with a first transmit power and the second stack may be associated with a second transmit power. The DSDA UE may be associated with a total transmit power that is a sum of the first transmit power and the second transmit power. Transmit power may be shared similarly to ULCA/SVTE scenarios. In various embodiments, based on the service being used, the transmit power may be shared between the first and second stacks. In various embodiments, full carrier aggregation combinations may be generated and considered on simultaneous allowed list. For example, MID band+MID band MSIM combos may be restricted, if it's not allowed simultaneously by hardware. The priority will be given based on service to withstand the highest carrier aggregation combinations.

Figure 7:
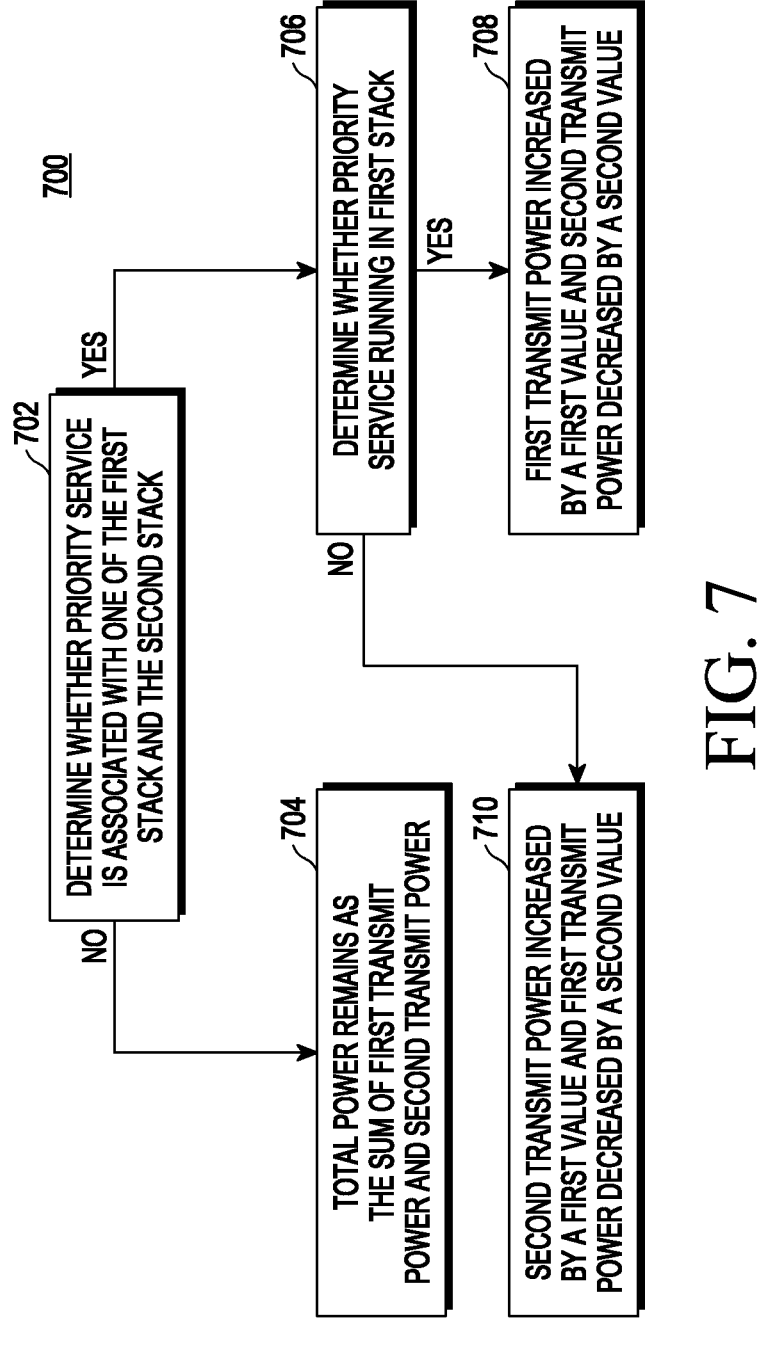
FIG. 7 is a flowchart illustrating an example method of sharing transmit power between the first and second stacks, according to various embodiments.

Reference is made to FIG. 7. FIG. 7 is a flowchart illustrating an example method 700 for sharing transmit power between the first and second stacks according to various embodiments.

At step 702, a determination is made whether a priority service is associated with one of the first stack and the second stack. As described above, the total power may be a sum of the first transmit power and the second transmit power. In case there is no priority service running, the method may move to step 704 where the total power remains as the sum of the first transmit power and the second transmit power.

At step 706, a determination is made whether the priority service is running in the first stack. Upon determining that the priority service is associated with the first stack, at step

708, the first transmit power may be increased by a first value and the second transmit power may be decreased by a second value.

At step 710, upon determining that the priority service is associated with the second stack, e.g., the priority service is not running in the first stack, the second transmit power may be increased by a first value and the first transmit power may be decreased by a second value. The total transmit power may remain the sum of the first transmit power and the second transmit power.

In various embodiments, the UE may not support the R18 MuSIM feature. In such a scenario, similar UE capability splitting can be provided, in that, a stack may choose to trigger tracking area update (TAU) when the ongoing service in a stack that needs disconnection is not a low latency required service and/or not voice call. In various embodiments, a criterion may be defined based on the type of services that may trigger TAU updates. Further, any dual sim dual standby (DSDS) device, such as a device prior to R18, can have a shared stack for 2 SIMs and work simultaneously by splitting the capability and indicating the same to the network. The hardware cost may thus be reduced.

Figure 8A:
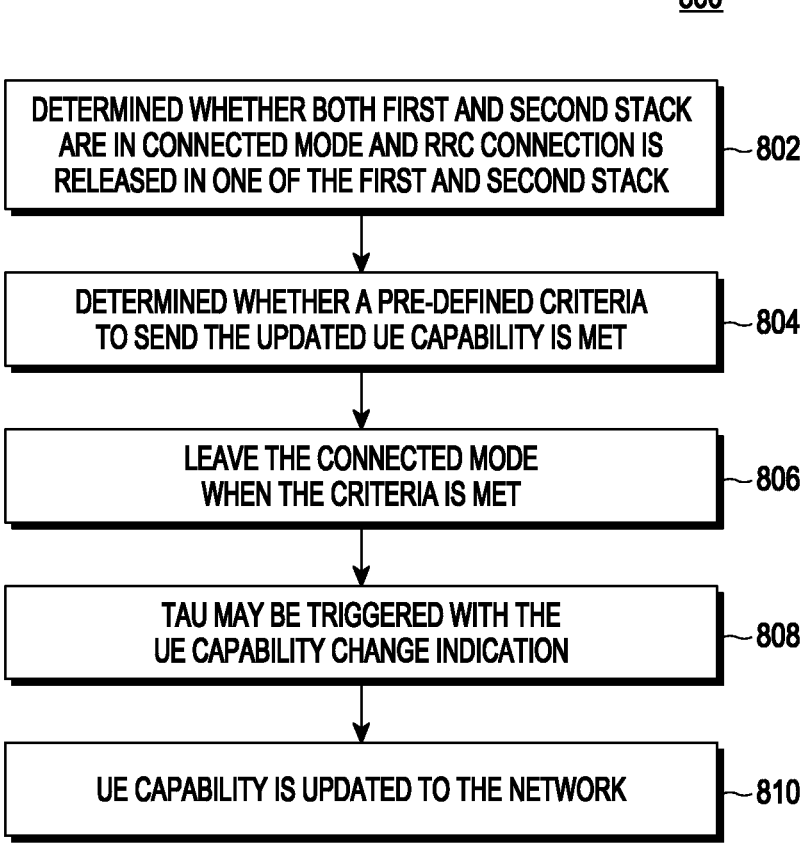
FIGS. 8A and 8B are flowcharts illustrating example methods of updating UE capability for devices not supporting the R18 MuSIM feature, according to various embodiments.
Figure 8B:
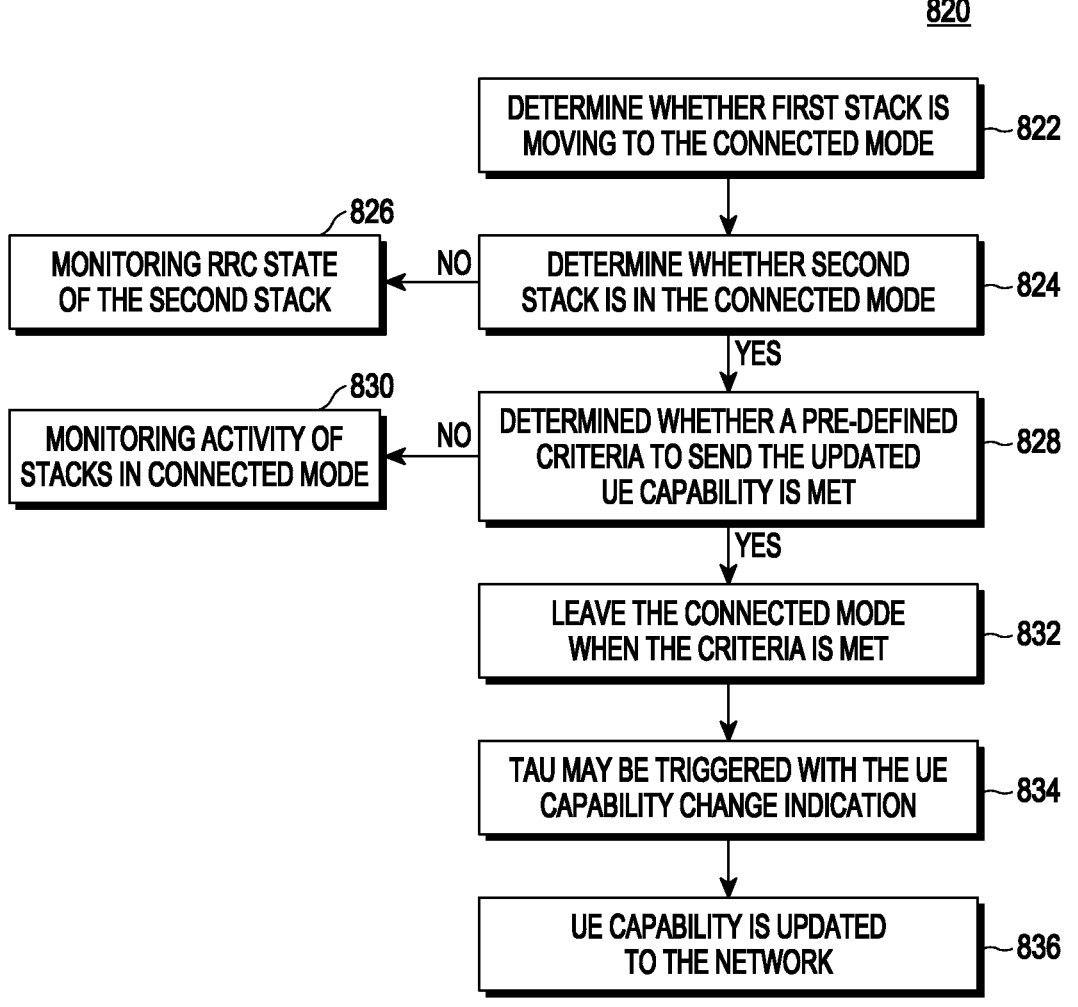

Reference is made to FIGS. 8A and 8B. FIGS. 8A and 8B are flowcharts illustrating an example method 800 and 820 related to updating UE capability for devices not supporting the R18 MuSIM feature, according to various embodiments.

As seen in FIG. 8A, at step 802, a determination is made whether both the first and second stacks are in connected mode and RRC connection is released in one of the first and second stacks.

At step 804, a determination is made whether the predefined criteria to send the updated UE capability is met. In case the criteria is met, at step 806, the stack may leave the connected mode when the criteria is met. At step 808, TAU may be triggered with the UE capability change indication. At step 810, the UE capability is updated to the network.

As seen in FIG. 8B, at step 822, a determination is made whether the first stack is moving to the connected mode. At step 824, a determination is made whether the second stack is in the connected mode. In case the second stack is not in connected mode, at step 826, the RRC state of the second stack may be monitored.

Further, in case the second stack is in connected mode, at step 828, a determination is made whether a pre-defined criterion to send the updated UE capability is met. In case the criteria is not met, at step 830, the activity of the stacks may continue to be monitored in connected mode. In case the criteria is met, at step 832, the stack may leave the connected mode when the criteria is met. At step 834, TAU may be triggered with the UE capability change indication. At step 836, the UE capability is updated to the network.

Figure 9:
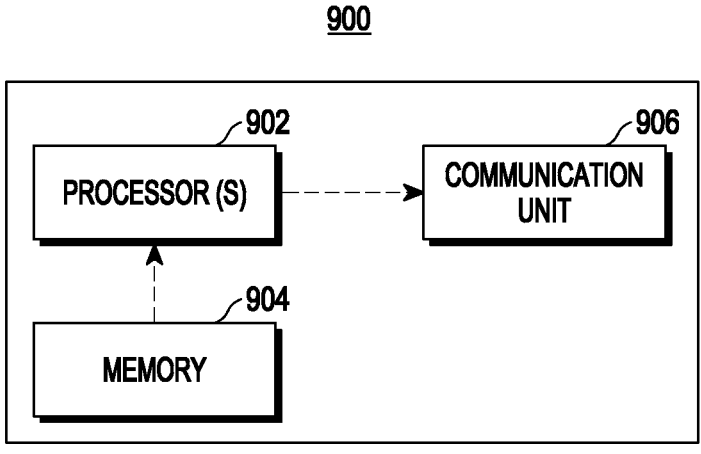
FIG. 9 is a block diagram illustrating an example configuration of a network entity, according to various embodiments.

FIG. 9 is a block diagram illustrating an example configuration of a network entity 900 according to various embodiments. The network entity shown in FIG. 9 may be in communication with the DSDA UE, such as, for sharing UE capability information. The network entity 900 may be associated with an LTE, NR SA, or NSA network. The network entity 900 may include at least one processor (e.g., including processing circuitry) 902, a memory 904 (e.g., storage), and a communication unit (e.g., including communication circuitry) 906 (e.g., communicator or communication interface). The communication unit 906 may perform one or more functions for transmitting and receiving signals via a wireless channel.

As an example, the processor 902 may be a single processing unit or a number of units, all of which could include multiple computing units. The processor 902 may be implemented as one or more microprocessors, microcomputers, microcontrollers, digital signal processors, central processing units, state machines, logic circuitries, and/or any devices that manipulate signals based on operational instructions. Among other capabilities, the processor 802 is configured to fetch and execute computer-readable instructions and data stored in the memory. The processor 902 may include one or a plurality of processors. At this time, one or a plurality of processors 902 may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors 802 may control the processing of the input data in accordance with a predefined operating rule or artificial intelligence (AI) model stored in the non-volatile memory and the volatile memory, e.g., memory unit 904. The predefined operating rule or artificial intelligence model is provided through training or learning.

The memory 904 may include, but is not limited to, a non-transitory computer-readable storage media, such as volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

In an example, the memory 904 may include a cache or random-access memory for the processor 902. In various embodiments, the memory 904 may include one or more modules comprising a set of instructions that may be executed to cause the network entity 900 to perform any one or more of the methods/processes disclosed herein. The one or more modules may be configured to perform the steps of the present disclosure. In an embodiment, each of the one or more modules may be a hardware unit that may be outside the memory 904. Hereinafter, it is understood that terms including "module" may correspond to a unit for processing and performing at least one function or operation, or method steps as discussed throughout the present disclosure. Further, the "module" may be implemented in hardware, software, or a combination of hardware and software.

In various embodiments, the memory 904 may be communicatively coupled to the at least one processor (or a controller) 902. The memory 904 may be configured to store data, and instructions executable by the at least one processor 902. In an embodiment, the memory 904 may communicate via a bus within the network entity 900. The functions, acts, or tasks illustrated in the figures or described may be performed by the programmed processor 902 for executing the instructions stored in the memory 904. The functions, acts, or tasks are independent of the particular type of instruction set, storage media, processor, or processing strategy and may be performed by software, hardware, integrated circuits, firmware, micro-code, and the like, operating alone or in combination. Likewise, processing strategies may include multiprocessing, multitasking, parallel processing, and the like.

Figure 10:
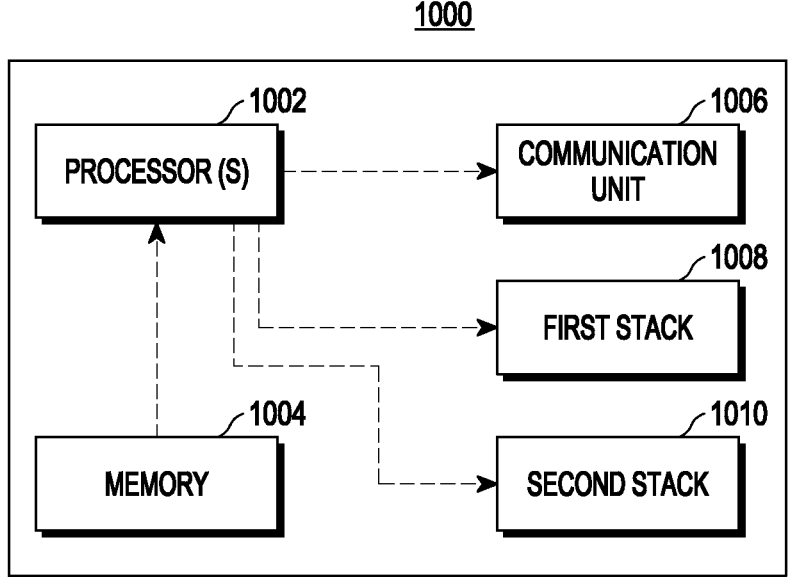
FIG. 10 is a block diagram illustrating an example configuration of a user equipment, according to various embodiments.

FIG. 10 is a block diagram illustrating an example configuration of a user equipment (UE), according to various embodiments. The UE shown in FIG. 10 may be configured to perform or may comprise a system or an electronic device to perform, the functionalities and methods related to the UE as detailed with respect to FIGS. 2-8 above.

Referring to FIG. 10, the UE 1000 may include at least one processor (e.g., including processing circuitry) 1002, a communication unit (e.g., including communication circuitry) 1006 (e.g., communicator or communication interface), a memory 1004 (e.g., storage), a first stack 1008, and a second stack 1010. By way of example, the UE 1000 may be a User Equipment, such as a cellular phone or another device that communicates over a plurality of cellular networks (such as a 3G, 4G, a 5G or pre-5G, 6G network or any future wireless communication network). The communication unit 1006 may include various communication circuitry and perform functions for transmitting and receiving signals via a wireless channel. The first stack 1008 and the second stack 1010 may have similar functionality as detailed above with respect to FIGS. 2-8.

As an example, the processor 1002 may be a single processing unit or a number of units, all of which could include multiple computing units. The processor 1002 may be implemented as one or more microprocessors, microcomputers, microcontrollers, digital signal processors, central processing units, state machines, logic circuitries, and/or any devices that manipulate signals based on operational instructions. Among other capabilities, the processor 1002 is configured to fetch and execute computer-readable instructions and data stored in the memory. The processor 1002 may include one or a plurality of processors. At this time, one or a plurality of processors 1002 may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors 902 may control the processing of the input data in accordance with a predefined operating rule or artificial intelligence (AI) model stored in the non-volatile memory and the volatile memory, e.g., memory 1004. The predefined operating rule or artificial intelligence model is provided through training or learning.

The memory 1004 may include, but is not limited to, a non-transitory computer-readable storage media, such as volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

In an example, the memory 1004 may include a cache or random-access memory for the processor 1002. In various embodiments, the memory 1004 may include one or more modules comprising a set of instructions that may be executed to cause the UE 1000 to perform any one or more of the methods/processes disclosed herein. The one or more modules may be configured to perform the steps of the present disclosure, as discussed herein. In an embodiment, each of the one or more modules may be a hardware unit that may be outside the memory 1004. Hereinafter, it is understood that terms including "module" may correspond to a unit for processing and performing at least one function or operation, or method steps as discussed throughout the present disclosure. Further, the "module" may be implemented in hardware, software, or a combination of hardware and software.

In various embodiments, the memory 1004 may be communicatively coupled to the at least one processor (or a controller) 1002. The memory 1004 may be configured to store data, and instructions executable by the at least one processor 1002. In an embodiment, the memory 1004 may communicate via a bus within the UE 1000. The functions, acts, or tasks illustrated in the figures or described may be performed by the programmed processor 1002 for executing the instructions stored in the memory 1004. The functions, acts, or tasks are independent of the particular type of instruction set, storage media, processor, or processing strategy and may be performed by software, hardware, integrated circuits, firmware, micro-code, and the like, operating alone or in combination. Likewise, processing strategies may include multiprocessing, multitasking, parallel processing, and the like.

Figure 11:
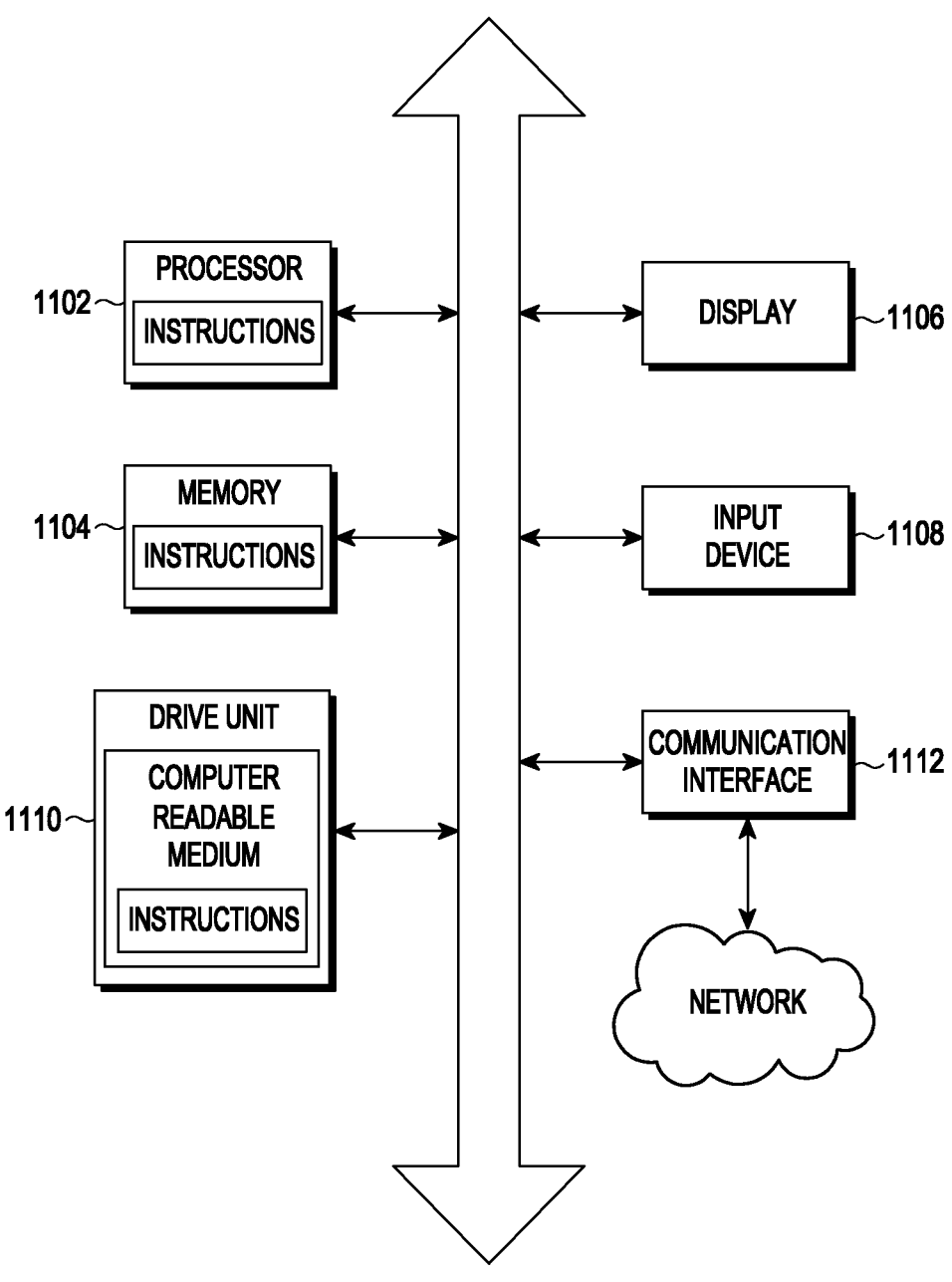
FIG. 11 is a diagram illustrating an example hardware configuration of the DSDA UE device, according to various embodiments.

FIG. 11 is a diagram illustrating an example implementation and a hardware configuration of the DSDA UE in the preceding figures through a computer system according to various embodiments. The computer system can include a set of instructions that can be executed to cause the computer system to perform any one or more of the methods disclosed. The computer system may operate as a standalone device or may be connected, e.g., using a network, to other computer systems or peripheral devices.

In a networked deployment, the computer system may operate in the capacity of a server or as a client-user computer in a server-client user network environment, or as a peer computer system in a peer-to-peer (or distributed) network environment. The computer system can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system is illustrated, the term "system" shall also be taken to include any collection of systems or sub-systems that individually or jointly execute a set, or multiple sets, of instructions to perform one or more computer functions.

The computer system may include a processor (e.g., including processing circuitry) 1102 e.g., a central processing unit (CPU), a graphics processing unit (GPU), or both. The processor 1102 may be a component in a variety of systems. For example, the processor 1102 may be part of a standard personal computer or a workstation. The processor 1102 may be one or more general processors, digital signal processors, application-specific integrated circuits, field-programmable gate arrays, servers, networks, digital circuits, analog circuits, combinations thereof, or other now-known or later developed devices for analyzing and processing data. The processor 1102 may implement a software program, such as code generated manually (e.g., programmed).

Figure 12:
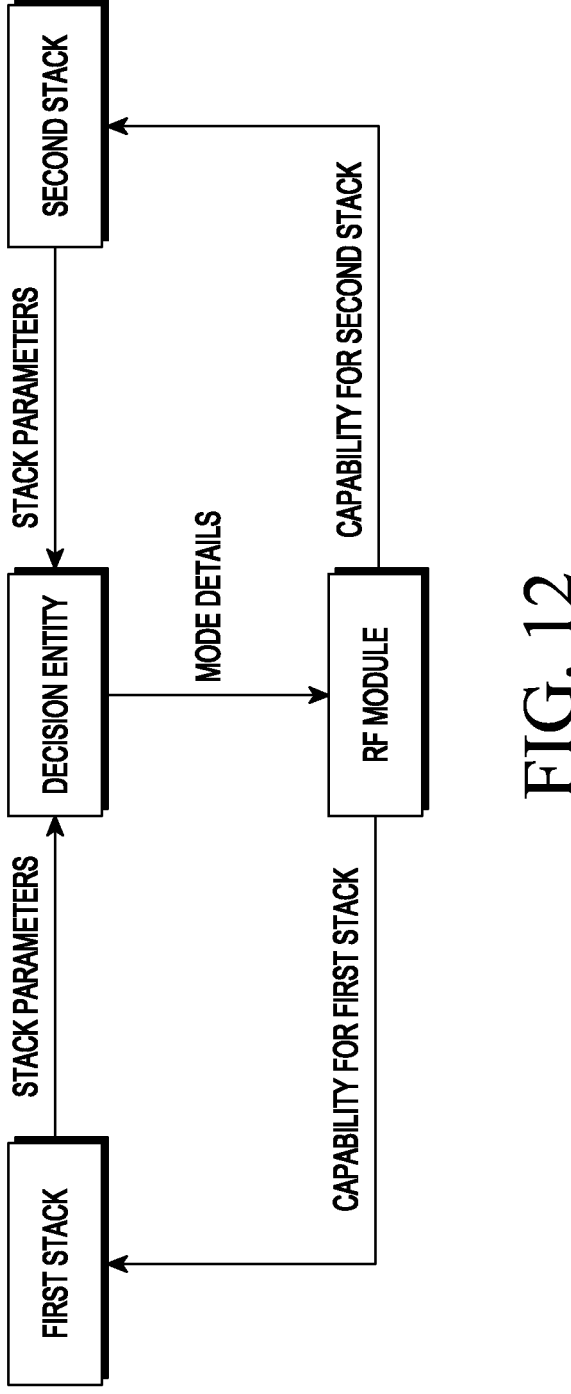
FIG. 12 is a block diagram illustrating an example configuration of a decision entity and RF module implemented by a processor of the DSDA UE, according to various embodiments.

In various embodiments, the processor 1102 may implement a decision entity and an RF module to update the UE capability. Referring to FIG. 12, the decision entity may be configured to be in communication with the first stack, the second stack, and the RF module. The first stack and the second stack may indicate the one or more stack parameters, such as the buffer occupancy, amount of data arrival, latency details, band information, etc., to the decision entity. In various embodiments, when the connection is just established, the lower layers may not have all details regarding the stack parameters. In such cases, available data such as the service for which connection is triggered can be shared with the entity as the service will be known to upper layers based on the slice/service that the user device is using. Based on the details received, the decision entity may be configured to decide the mode of split and share the mode and band details with the RF module. The RF module may be configured to split the data based on the mode and band details and will share the updated capabilities with the RRC of respective stacks.

The computer system may include a memory 1104, such as a memory that can communicate via a bus. The memory 1104 may include but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In an example, the memory includes a cache or random-access memory for the processor. In various examples, the memory is separate from the processor, such as a cache memory of a processor, the system memory, or other memory. The memory 1104 may be an external storage device or database for storing data. The memory 1104 is operable to store instructions executable by the processor. The functions, acts, or tasks illustrated in the figures or described may be performed by the programmed processor for executing the instructions stored in the memory. The functions, acts, or tasks are independent of the particular type of instruction set, storage media, processor, or processing strategy and may be performed by software, hardware, integrated circuits, firmware, micro-code, and the like, operating alone or in combination. Likewise, processing strategies may include multiprocessing, multitasking, parallel processing, and the like.

As shown, the computer system may or may not further include a display 1106, such as a liquid crystal display (LCD), an organic light-emitting diode (OLED), a flat panel display, a solid-state display, a cathode ray tube (CRT), a projector, a printer or other now known or later developed display device for outputting determined information. The display may act as an interface for the user to see the functioning of the processor, or specifically as an interface with the software stored in the memory or the drive unit.

Additionally, the computer system may include an input device (e.g., including various input circuitry) 1108 configured to allow a user to interact with any of the components of the system. The computer system may also include a disk or optical drive unit 1110. The disk drive unit may include a computer-readable medium in which one or more sets of instructions, e.g., software, can be embedded. Further, the instructions may embody one or more of the methods or logic as described. In a particular example, the instructions may reside completely, or at least partially, within the memory or within the processor during execution by the computer system.

The disclosure contemplates a computer-readable medium that includes instructions or receives and executes instructions responsive to a propagated signal so that a device connected to a network can communicate voice, video, audio, images, or any other data over the network. Further, the instructions may be transmitted or received over the network via a communication port or interface (e.g., including various communication circuitry) 1112 or using a bus. The communication port or interface may be a part of the processor or maybe a separate component. The communication port may be created in software or maybe a physical connection in hardware. The communication port may be configured to connect with a network, external media, the display, or any other components in the system, or combinations thereof. The connection with the network may be a physical connection, such as a wired Ethernet connection, or may be established wirelessly as discussed later. Likewise, the additional connections with other components of the system may be physical or may be established wirelessly. The network may alternatively be directly connected to the bus.

The network may include wired networks, wireless networks, Ethernet AVB networks, or combinations thereof. The wireless network may be a cellular telephone network, 802.11, 802.16, 802.20, 802.1Q, or a WiMax network. Further, network 826 may be a public network, such as the Internet, a private network, such as an intranet, or combinations thereof, and may utilize a variety of networking protocols now available or later developed including, but not limited to TCP/IP-based networking protocols. The system is not limited to operation with any particular standards and protocols. For example, standards for Internet and other packet-switched network transmissions (e.g., TCP/IP, UDP/IP, HTML, and HTTP) may be used.

Accordingly, a mechanism is defined to split and share the UE capability for 2 stacks when both are simultaneously connected with the network. In the current devices in the market if a device is DSDA, then the device will have 2 separate RF stacks to support 2 protocol stacks independently. With the introduction of R18 MuSIM WI, separate stacks is not required anymore and a device with a shared RF entity can also act as a DSDA device, and it is important to define a mechanism to split the capability.

In disclosure, service information is used which is derived based on buffer occupancy, amount of data arrival, latency, and band information of 2 stacks to split the RF capability between stacks. Thus, a method of splitting the UE capability based on the ongoing services and the cell/band information derived from both stacks is described.

Further, the disclosure can be used in any order and in any combination. Unless otherwise defined, all technical and scientific terms used herein have the same meaning as commonly understood by one of ordinary skilled in the art to which this disclosure belongs. The system, methods, and examples provided herein are illustrative only and not intended to be limiting.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for transmitting user equipment (UE) capability for a dual subscriber identity module (SIM) dual active (DSDA) user equipment (DSDA UE) by an electronic device, the method comprising:

determining a corresponding service category for each of a first stack and a second stack of the DSDA UE based on at least one stack parameter, wherein the at least one stack parameter is indicated by each of the first stack and the second stack;

determining a mode associated with the DSDA UE based on the corresponding service categories of the first stack and the second stack;

receiving, from at least one network entity, corresponding band information associated with the first stack and the second stack, wherein the at least one network entity is associated with a network in communication with the DSDA UE;

adjusting UE capability associated with the DSDA UE based on the mode and the corresponding band information associated with the first stack and the second stack; and transmitting, to the at least one network entity, the adjusted UE capability.

2. The method of claim 1, wherein adjusting the UE capability comprises:

accessing a complete list of carrier aggregation (CA) multi-radio access technology (RAT) dual connectivity (MRDC) capability combinations associated with the DSDA UE;

generating, for each of the first and second stacks, a corresponding subset combination list; and updating the corresponding subset combination list based on a change in band information associated with the first stack and the second stack.

3. The method of claim 1, wherein adjusting the UE capability comprises:

accessing a complete list of carrier aggregation (CA)/ multi-radio access technology (RAT) dual connectivity (MRDC) capability combinations associated with the DSDA UE, wherein the complete list of CA/MRDC capability combinations is stored in a database;

generating, based on the complete list of CA/MRDC capability combinations, a corresponding subset combination list for the first stack based on the corresponding service category associated with the first stack, and corresponding band information associated with each of the first stack and the second stack;

generating, based on the complete list of CA/MRDC capability combinations, a corresponding subset combination list for the second stack based on the corresponding service category associated with the second stack, and corresponding band information associated with each of the first stack and the second stack;

determining a change in band information associated with one of the first stack and the second stack;

updating the corresponding subset combination list associated with the one of the first stack and the second stack based on the change in band information; and accessing the updated corresponding subset combination list by the other of the first stack and the second stack.

4. The method of claim 3, comprising:

determining a change in service category associated with one of the first stack and the second stack;

based on determining the change in service category associated with one of the first stack and the second stack, updating the corresponding subset combination list associated with the first stack and the corresponding subset combination list associated with the second stack based on the band information associated with the first stack and the second stack; and accessing the updated corresponding subset combination list associated with the first stack and the updated corresponding subset combination list associated with the second stack by the first stack and the second stack.

5. The method of claim 1, wherein adjusting the UE capability comprises:

accessing a complete list of carrier aggregation (CA)/ multi-radio access technology (RAT) dual connectivity (MRDC) capability combinations associated with the DSDA UE, wherein the complete list of CA/MRDC capability combinations is stored in a database;

generating, based on the complete list of CA/MRDC capability combinations, a corresponding band list for the first stack based on the corresponding service category associated with the first stack and corresponding band information associated with each of the first stack and the second stack, wherein the band list associated with the first stack comprises at least one proposed band for establishing a connection with the first stack;

generating, based on the complete list of CA/MRDC capability combinations, a corresponding band list for the second stack based on the corresponding service category associated with the second stack and corresponding band information associated with each of the first stack and the second stack, wherein the band list associated with the second stack comprises at least one proposed band for establishing a connection with the second stack;

determining a change in band information associated with one of the first stack and the second stack;

updating the corresponding band list associated with the first stack and the corresponding band list associated with the second stack based on the change in band information; and accessing the updated corresponding band list associated with the first stack and the corresponding band list associated with the second stack by the first stack and the second stack respectively.

6. The method of claim 1, wherein adjusting the UE capability comprises:

accessing a complete list of carrier aggregation (CA)/ multi-radio access technology (RAT) dual connectivity (MRDC) capability combinations associated with the DSDA UE, wherein the complete list of CA/MRDC capability combinations is stored in a database;

generating, based on the complete list of CA/MRDC capability combinations, a corresponding band list for the first stack associated with a first band and the second stack associated with a second band, wherein the corresponding band list for the first stack and the second stack is generated based on a priority of service associated with the first band and a priority of service associated with the second band;

determining whether the first stack is associated with a high-priority service and whether the first stack establishes a connection with the second band; and upon determining that the first stack is associated with a high-priority service and the first stack has established a connection with the second band:

causing the second stack to drop the second band;

updating the corresponding band list associated with the first stack and the corresponding band list associated with the second stack based on the drop of the second band; and accessing the updated corresponding band list associated with the first stack and the corresponding band list associated with the second stack by the first stack and the second stack.

7. The method of claim 1, wherein the at least one stack parameter comprises at least one of buffer occupancy, amount of data arrival, latency details, and data type.

8. The method of claim 1, wherein determining the mode comprises:

determining a current combination of the corresponding service category of the first stack with the corresponding service category of the second stack;

accessing a list of pre-stored service category combinations, the list of pre-stored service category combinations comprising a plurality of service combinations of the corresponding service categories of the first stack and the second stack, wherein each of the plurality of service combinations is associated with a linked mode;

identifying, from the list of pre-stored service category combinations, a matched service category combination that matches with the determined current combination of the corresponding service category of the first stack with the corresponding service category of the second stack;

accessing the linked mode associated with the match service category combination; and determining the linked mode to be the mode associated with the DSDA UE.

9. The method of claim 1, wherein receiving the corresponding band information comprises:

receiving, from the at least one network entity, for each of the first stack and the second stack, a corresponding system information block (SIB), and extracting the band information from the corresponding SIB, wherein the corresponding band information comprises serving cell information and neighboring cell information.

10. The method of claim 1, wherein the first stack is associated with a first transmit power, the second stack is associated with a second transmit power, and the DSDA UE is associated with a total transmit power corresponding to a sum of the first transmit power and the second transmit power, and wherein the method comprises:

determining whether a priority service is associated with one of the first stack and the second stack;

upon determining that the priority service is associated with the first stack, increasing the first transmit power by a first value and decreasing the second transmit power by a second value; and upon determining that the priority service is associated with the second stack, increasing the second transmit power by the first value and decreasing the first transmit power by the second value, wherein the total transmit power remains a sum of the first transmit power and the second transmit power.

11. An electronic device configured to transmit user equipment (UE) capability for a dual subscriber identity module (SIM) dual active (DSDA) user equipment (DSDA UE), the electronic device comprising:

a first stack;

a second stack;

memory storing instructions; and at least one processor comprising processing circuitry, wherein the instructions, when executed by the at least one processor, cause the electronic device to:

determine a corresponding service category for each of the first stack and the second stack based on at least one stack parameter, wherein the at least one stack parameter is indicated by each of the first stack and the second stack;

determine a mode associated with the DSDA UE based on the corresponding service categories of the first stack and the second stack;

receive, from at least one network entity, corresponding band information associated with the first stack and the second stack, wherein the at least one network entity is associated with a network in communication with the DSDA UE;

adjust UE capability associated with the DSDA UE based on the mode and the corresponding band information associated with the first stack and the second stack; and transmit, to the at least one network entity, the adjusted UE capability to the at least one network entity associated with the network.

12. The electronic device of claim 11, wherein to adjust the UE capability, the instructions, when executed by the at least one processor, cause the electronic device to:

access a complete list of carrier aggregation (CA)multi-radio access technology (RAT) dual connectivity (MRDC) capability combinations associated with the DSDA UE;

generate, for each of the first and second stacks, a corresponding subset combination list; and update the corresponding subset combination list based on a change in band information associated with the first stack and the second stack.

13. The electronic device of claim 11, wherein to adjust the UE capability, the instructions, when executed by the at least one processor, cause the electronic device to:

access a complete list of carrier aggregation (CA)/multi-radio access technology (RAT) dual connectivity (MRDC) capability combinations associated with the DSDA UE, wherein the complete list of CA/MRDC capability combinations is stored in a database;

generate, based on the complete list of CA/MRDC capability combinations, a corresponding subset combination list for the first stack based on the corresponding service category associated with the first stack and corresponding band information associated with each of the first stack and the second stack;

generate, based on the complete list of CA/MRDC capability combinations, a corresponding subset combination list for the second stack based on the corresponding service category associated with the second stack and corresponding band information associated with each of the first stack and the second stack;

determine a change in band information associated with one of the first stack and the second stack;

update the corresponding subset combination list associated with the one of the first stack and the second stack based on the change in band information; and access the updated corresponding subset combination list by the other of the first stack and the second stack.

14. The electronic device of claim 13, wherein the instructions, when executed by the at least one processor, cause the electronic device to:

determine a change in service category associated with one of the first stack and the second stack;

upon determining the change in service category associated with one of the first stack and the second stack, update the corresponding subset combination list associated with the first stack and the corresponding subset combination list associated with the second stack based on the band information associated with the first stack and the second stack; and access the updated corresponding subset combination list associated with the first stack and the updated corresponding subset combination list associated with the second stack by the first stack and the second stack.

15. The electronic device of claim 11, wherein to adjust the UE capability, the instructions, when executed by the at least one processor, cause the electronic device to:

access a complete list of carrier aggregation (CA)/multi-radio access technology (RAT) dual connectivity (MRDC) capability combinations associated with the DSDA UE, wherein the complete list of CA/MRDC capability combinations is stored in a database;

generate, based on the complete list of CA/MRDC capability combinations, a corresponding band list for the first stack based on the corresponding service category associated with the first stack and corresponding band information associated with each of the first stack and the second stack, wherein the band list associated with the first stack comprises at least one proposed band for establishing a connection with the first stack;

generate, based on the complete list of CA/MRDC capability combinations, a corresponding band list for the second stack based on the corresponding service category associated with the second stack and corresponding band information associated with each of the first stack and the second stack, wherein the band list associated with the second stack comprises at least one proposed band for establishing a connection with the second stack;

determine a change in band information associated with one of the first stack and the second stack;

update the corresponding band list associated with the first stack and the corresponding band list associated with the second stack based on the change in band information; and access the updated corresponding band list associated with the first stack and the corresponding band list associated with the second stack by the first stack and the second stack, respectively.

16. The electronic device of claim 11, wherein to adjust the UE capability, the instructions, when executed by the at least one processor, cause the electronic device to:

access a complete list of carrier aggregation (CA)/multi-radio access technology (RAT) dual connectivity (MRDC) capability combinations associated with the DSDA UE, wherein the complete list of CA/MRDC capability combinations is stored in a database;

generate, based on the complete list of CA/MRDC capability combinations, a corresponding band list for the first stack associated with a first band and the second stack associated with a second band, wherein the corresponding band list for the first stack and the second stack is generated based on a priority of service associated with the first band and a priority of service associated with the second band;

determine whether the first stack is associated with a high-priority service and whether the first stack establishes a connection with the second band; and upon determining that the first stack is associated with a high-priority service and the first stack has established a connection with the second band:

cause the second stack to drop the second band;

update the corresponding band list associated with the first stack and the corresponding band list associated with the second stack based on the drop of the second band; and access the updated corresponding band list associated with the first stack and the corresponding band list associated with the second stack by the first stack and the second stack, wherein the at least one stack parameter comprise at least one of buffer occupancy, amount of data arrival, latency details, and data type.

17. The electronic device of claim 11, wherein to determine the mode, the instructions, when executed by the at least one processor, cause the electronic device to:

determine a current combination of the corresponding service category of the first stack with the corresponding service category of the second stack;

access a list of pre-stored service category combinations, the list of pre-stored service category combinations comprising a plurality of service combinations of the corresponding service categories of the first stack and the second stack, wherein each of the plurality of service combinations is associated with a linked mode;

identify, from the list of pre-stored service category combinations, a matched service category combination that matches with the determined combination of the corresponding service category of the first stack with the corresponding service category of the second stack;

access the linked mode associated with the match service category combination; and determine the linked mode to be the mode associated with the DSDA UE.

18. The electronic device of claim 11, wherein to receive corresponding band information, the instructions, when executed by the at least one processor, cause the electronic device to receive, for each of the first stack and the second stack, a corresponding system information block (SIB) from the one or more network entity associated with the network, and extract the band information from the corresponding SIB, wherein the corresponding band information comprises serving cell information and neighboring cell information.

19. The electronic device of claim 11, wherein the first stack is associated with a first transmit power, the second stack is associated with a second transmit power, and the DSDA UE is associated with a total transmit power corresponding to a sum of the first transmit power and the second transmit power, and wherein the instructions, when executed by the at least one processor, cause the electronic device to:

determine whether a priority service is associated with one of the first stack \ and the second stack;

upon determining that the priority service is associated with the first stack, increase the first transmit power by a first value and decrease the second transmit power by a second value, and upon determining that the priority service is associated with the second stack, increase the second transmit power by a first value and decrease the first transmit power by a second value, wherein the total transmit power remains a sum of the first transmit power and the second transmit power.

20. A non-transitory computer readable storage medium storing instructions which, when executed by at least one processor of an electronic device, causes the electronic device to perform operations for transmitting user equipment (UE) capability for a dual subscriber identity module (SIM) dual active (DSDA) user equipment (DSDA UE), the operations comprising:

determining a corresponding service category for each of a first stack and a second stack of the DSDA UE based on at least one stack parameter, wherein the at least one stack parameter is indicated by each of the first stack and the second stack;

determining a mode associated with the DSDA UE based on the corresponding service categories of the first stack and the second stack;

receiving, from at least one network entity, corresponding band information associated with the first stack and the second stack, wherein the at least one network entity is associated with a network in communication with the DSDA UE;

adjusting UE capability associated with the DSDA UE based on the mode and the corresponding band information associated with the first stack and the second stack; and transmitting, to the at least one network entity, the adjusted UE capability.

* * * * *